United States Patent
Sillanpaa et al.

(10) Patent No.: US 10,827,554 B2
(45) Date of Patent: Nov. 3, 2020

(54) COMBINED RRC INACTIVE RESUME, RRC RNA AND NAS REGISTRATION PROCEDURE

(71) Applicant: Nokia Technologies Oy, Espoo (FI)

(72) Inventors: Anna Sillanpaa, Helsinki (FI); Janne Kaasalainen, Söderkulla (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/526,787

(22) Filed: Jul. 30, 2019

(65) Prior Publication Data

US 2020/0053818 A1 Feb. 13, 2020

Related U.S. Application Data

(60) Provisional application No. 62/717,412, filed on Aug. 10, 2018.

(51) Int. Cl.
| | |
|---|---|
| H04W 4/00 | (2018.01) |
| H04W 76/27 | (2018.01) |
| H04W 60/02 | (2009.01) |
| H04W 68/00 | (2009.01) |

(52) U.S. Cl.
CPC .......... *H04W 76/27* (2018.02); *H04W 60/02* (2013.01); *H04W 68/00* (2013.01)

(58) Field of Classification Search
CPC ...... H04W 76/27; H04W 60/02; H04W 68/00
See application file for complete search history.

(56) References Cited

U.S. PATENT DOCUMENTS

| | | |
|---|---|---|
| 2018/0092155 A1 | 3/2018 | Hong et al. |
| 2018/0092157 A1 | 3/2018 | Chen |
| 2018/0098311 A1 | 4/2018 | Hong et al. |
| 2018/0176834 A1 | 6/2018 | Wei et al. |
| 2018/0270894 A1* | 9/2018 | Park ............... H04W 36/0055 |
| 2019/0268750 A1* | 8/2019 | Lee .................. H04W 68/00 |

FOREIGN PATENT DOCUMENTS

| | | |
|---|---|---|
| EP | 3 570 627 A1 | 11/2019 |
| WO | 2017/222290 A1 | 12/2017 |
| WO | WO 2018/130889 A1 | 7/2018 |

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.2.0, Jun. 2018, pp. 1-87.

(Continued)

*Primary Examiner* — Charles T Shedrick
(74) *Attorney, Agent, or Firm* — Harrington & Smith

(57) ABSTRACT

In accordance with an example embodiment of the present invention, a method comprising: sending, by a user equipment, a radio resource control (RRC) message, wherein the RRC message triggers transition of the user equipment from an RRC inactive state to an RRC connected state, wherein the RRC message is interpreted as a radio access network notification area (RNA) update; and receiving, by the user equipment, an RRC response message. The RRC message comprises a cause value indicating a combined RNA update with a non-access stratum (NAS) message.

22 Claims, 18 Drawing Sheets

(56) References Cited

OTHER PUBLICATIONS

"3rd Generation Partnership Project; Technical Specification Group Services and System Aspects; Procedures for the 5G System; Stage 2 (Release 15)", 3GPP TS 23.502, V15.2.0, Jun. 2018, pp. 1-308.
"RAN Based Notification Area Update", 3GPP TSG-RAN WG2 Meeting #98, R2-1704587, Agenda Item: 10.4.1.5, Vivo, Apr. 15-19, 2017, 3 pages.
"3rd Generation Partnership Project; Technical Specification Group Services and System Aspects; System Architecture for the 5G System; Stage 2 (Release 15)", 3GPP TS 23.501, V15.2.0, Jun. 2018, pp. 1-217.
"3rd Generation Partnership Project; Technical Specification Group Radio Access Network; NR; Radio Resource Control (RRC) protocol specification (Release 15)", 3GPP TS 38.331, V15.2.1, Jun. 2018, pp. 1-303.
R2-1800435, "CN area updating in RRC_INACTIVE", Ericsson, 3GPP TSG-RAN WG2 #NR AH1801, Jan. 2018, 5 pages.
R2-1701948, "Cell reselection crossing RAN notification area boundary", NEC, 3GPP TSG-RAN WG2 #97, Feb. 2017, 3 pages.
R2-168523, "Details on the NR_RRC_INACTIVE state", Intel Corporation, 3GPP TSG RAN WG2 Meeting #96, Nov. 2016, 5 pages.

\* cited by examiner

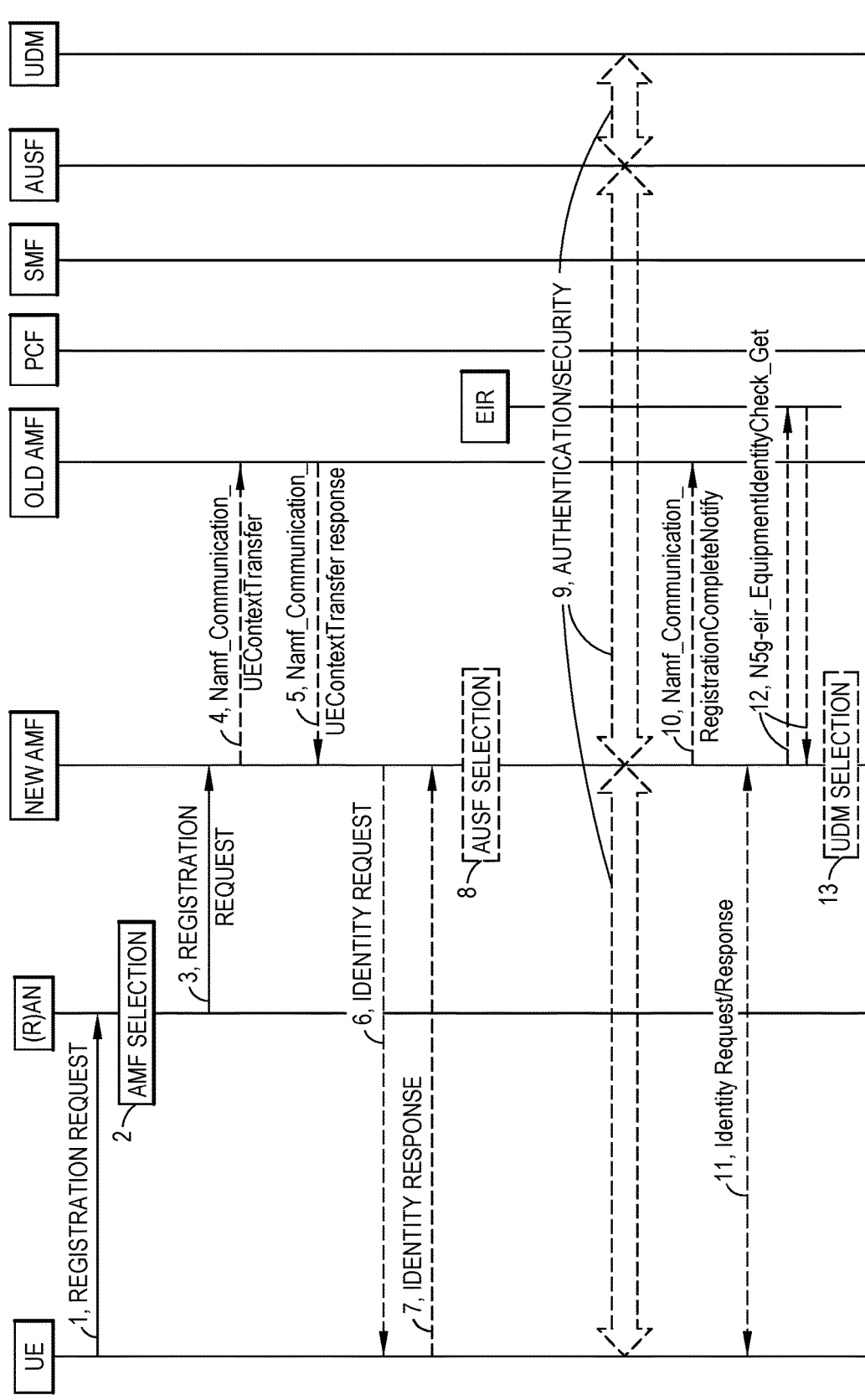

COMBINED RRC INACTIVE RESUME, RRC RNA AND NAS REGISTRATION PROCEDURE

TECHNICAL FIELD

This invention relates generally wireless communication and, particular, to user equipment starting a new resume procedure for uplink data.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

3GPP Rel-15 5G specifications have introduced new state called "RRC Inactive" or "RRC connected inactive". In this state, the UE has user context established with the core NW as when he is in RRC connected state. However, from radio interface point of view the user is in "idle" mode in the sense that he is not continuously sending and receiving UL/DL data and thus not allocated all radio resources required for sending and receiving UL/DL data. When UE moves to new RNA and TA at the same time, the UE needs to send both RAN notification area updates and core network registrations when he leaves related areas.

While RRC inactive state is a new state defined in the current 3GPP specification, this new state definition does not at the moment address how the coinciding messages are sent. If these updates are sent separately even when their sending coincides timewise, radio resources are wasted and handling of the messages is more complex and prone to errors. This also applies to closely enough timewise sending for periodic updates. The need for combined update happens normally due to a UE move but it could happen also due to coinciding timer values. Timer values can also be different for the two, but they could be set so that every Nth, e.g. every $10^{th}$, coincides.

The current invention moves beyond these techniques.

Acronyms or abbreviations that may be found in the specification and/or the drawing figures are defined within the context of this disclosure or as follows below:

3GPP Third Generation Partnership Project
5G 5th Generation
ACK Acknowledgement
BS Base Station
DCI Downlink Control Information
DL Downlink
eMBB enhanced Mobile Broadband
eNB or eNodeB base station, evolved Node B
gNB NR/5G Node B
IE Information Element
IP Internet Protocol
IMT International Mobile Telecommunications (4, 4.5 or 5G)
LTE Long Term Evolution
LTE-A Long Term Evolution—Advanced
MCS Modulation and Coding Scheme
MBB Mobile Broadband
MME Mobility Management Entity
MSG Message
NACK Negative Acknowledgement
NCE Network Control Entity
NG Next Generation
NGAP NG Application Protocol
NG-RAN NG Radio Access Network
NR New Radio, NR Radio Access
NW Network
RA Resource Allocation
RAN Radio Access Network
RAR Random Access Response
RB Resource Block
Rel Release
RE Resource Element
RNA RAN notification area
RS Reference Signal
RRC Radio Resource Control
Rx Receive, Reception, or Receiver
TA Tracking Area
TS Technical Specification
Tx Transmit, Transmission, or Transmitter
UE User Equipment
UL Uplink

SUMMARY

Various aspects of examples of the invention are set out in the claims.

According to a first aspect of the present invention, a method comprising: sending, by a user equipment, a radio resource control (RRC) message, wherein the RRC message triggers transition of the user equipment from an RRC inactive state to an RRC connected state, wherein the RRC message is interpreted as a radio access network notification area (RNA) update; and receiving, by the user equipment, an RRC response message.

According to a second aspect of the present invention, an apparatus comprising: at least one processor; and at least one memory including computer program code, wherein the at least one memory and the computer program code are configured, with the at least one processor, to cause the apparatus to at least: send a radio resource control (RRC) message, wherein the RRC message triggers transition of the apparatus from an RRC inactive state to an RRC connected state, wherein the RRC message is interpreted as a radio access network notification area (RNA) update; and receive an RRC response message.

According to a third aspect of the present invention, A non-transitory computer storage medium encoded with a computer program, the program comprising instructions that when executed by one or more computers cause the one or more computers to perform operations comprising: sending, by a user equipment, a radio resource control (RRC) message, wherein the RRC message triggers transition of the user equipment from an RRC inactive state to an RRC connected state, wherein the RRC message is interpreted as a radio access network notification area (RNA) update; and receiving, by the user equipment, an RRC response message.

According to a fourth aspect of the present invention, a method comprising: receiving, by a network node, a radio resource control (RRC) message from a user equipment, wherein the RRC message triggers transition of the user equipment from an RRC inactive state to an RRC connected state, wherein the RRC message is interpreted as a radio access network notification area (RNA) update; and sending, by the network node, an RRC response message to the user equipment.

According to a fifth aspect of the present invention, an apparatus comprising: at least one processor; and at least one memory including computer program code, wherein the at least one memory and the computer program code are configured, with the at least one processor, to cause the apparatus to at least: receive a radio resource control (RRC) message from a user equipment, wherein the RRC message triggers transition of the user equipment from an RRC inactive state to an RRC connected state, wherein the RRC message is interpreted as a radio access network notification area (RNA) update; and send an RRC response message to the user equipment.

According to a sixth aspect of the present invention, A non-transitory computer storage medium encoded with a computer program, the program comprising instructions that when executed by one or more computers cause the one or more computers to perform operations comprising: receiving, by a network node, a radio resource control (RRC) message from a user equipment, wherein the RRC message triggers transition of the user equipment from an RRC inactive state to an RRC connected state, wherein the RRC message is interpreted as a radio access network notification area (RNA) update; and sending, by the network node, an RRC response message to the user equipment.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described in more detail below, an RNA update may coincide with core NW registration update or other similar procedures such as "N2 Notification procedure/AMF requested NG-RAN location updating". To optimize such coinciding procedures, this invention the following one procedure:

Initiate RRC Resume procedure.

Combine RRC Resume procedure with RRC RNA Update and NAS Registration. Interpret RRCResumeRequest as RNA update. The request message can contain a cause value explicitly indicating combined RNA update and a core NW level NAS registration procedure. The RRCResumeRequest can contain RAN update related parameters. Include NAS Registration (or other similar) message in RRCResumeRequest and it is then further provided over N2 to AMF with NGAP Uplink NAS Transport (or other NGAP) message. (Note that these message names are examples of message names and that the current invention should not be limited only to these message names if later some other names will be defined.)

RRCResume/Release could contain additional RNA information to be used by the UE in the new RNA and/or Tracking Area/Registration area from the core NW. RRCResume/Release may contain NAS level acknowledgement to the NAS registration request (or other NAS message), e.g. such NAS level message or related parameter(s) in RRC message. Nonetheless, this paragraph and the one above are not describing all the message exchange possibilities.

Figure 1:
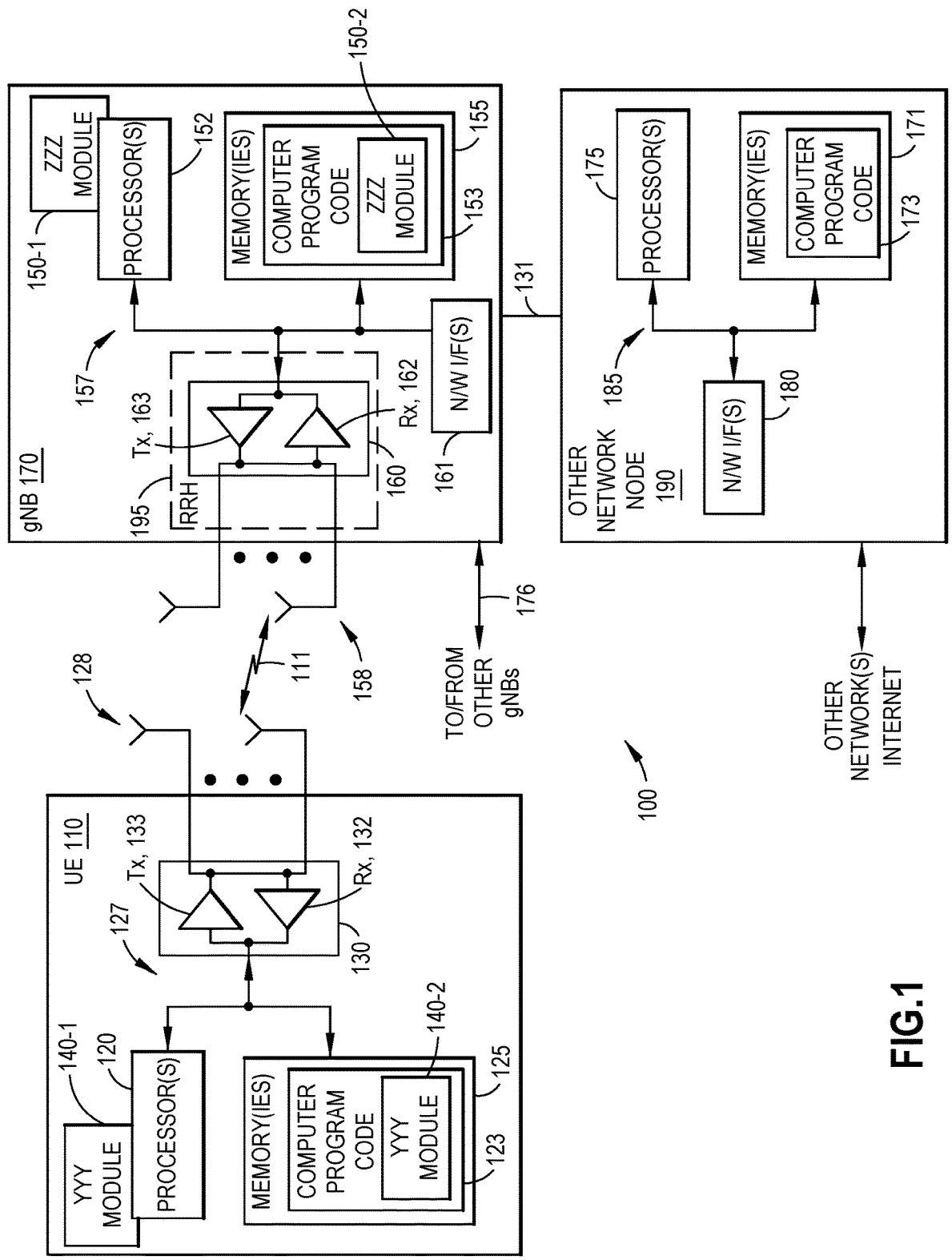
FIG. 1 is a block diagram of an exemplary system in which the exemplary embodiments may be practiced.

Before turning to how an exemplary embodiment would function, FIG. 1 is presented showing a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. Note that the YYY module allows functionality for the usage of control resources for data transmission where any method or examples of such embodiments discussed herein can be practiced. The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with base station 170 via a wireless link 111.

The base station 170 (which in the shown embodiment is a Radio Access Node (RAN), a gNB, NR/5G Node B, or possibly an evolved NodeB for LTE connected to 5GC, long term evolution, but could be any similar access point to a wireless network) that provides access by wireless devices such as the UE 110 to the wireless network 100. The base station 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. Note that the ZZZ module allows functionality for the usage of control resources for data transmission where any method or examples of such embodiments discussed herein can be practiced. The base station 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the base station 170 to perform one or more of the operations as described herein. The one or more network interfaces 161 communicate over a network such as via the links 176 and 131. Two or more base stations 170 communicate using link 178, while the base station can communicate with other entities via link 176, where both link 176, sand 178 may be wired or wireless or both and may implement, e.g., an Xn interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the base station 170 being physically in a different location from the RRH, and the one or more buses 157 could be implemented in part as fiber optic cable to connect the other elements of the base station 170 to the RRH 195.

It is noted that description herein indicates that "cells" perform functions, but it should be clear that the base station that forms the cell would perform the functions. The cell makes up part of a base station. That is, there can be multiple cells per base station. For instance, there could be three cells for a single base station carrier frequency and associated bandwidth, each cell covering one-third of a 360-degree area so that the single base station's coverage area covers an approximate oval or circle. Furthermore, each cell can correspond to a single carrier and a base station may use multiple carriers. So if there are three 120-degree cells per carrier and two carriers, then the base station has a total of 6 cells.

The base station 170 is coupled via a link 131 to the some other network node 190. The link 131 may be implemented as a type of interface that is not necessarily wireless. The other network node 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

Moreover, the Radio Access Network (RAN) also has "logical" elements, namely, a Central Unit (CU) and a Distributed Unit (DU). The CU is a logical node which may include the functions (i.e., gNB functions) such as transfer of user data, mobility control, radio access network sharing, positioning, session management, etc., except those functions allocated exclusively to the DU. The CU may control the operation of DUs over a front-haul (F1) interface. The CU may also be known as BBU/REC/RCC/C-RAN/V-RAN. The DU is a logical node which may include a subset of the functions (i.e., gNB functions), depending on the functional split option. The operation of the DU may be controlled by the CU. A Distributed Unit (DU) may also be known with other names like RRH/RRU/RE/RU. The DU may also contain intra-DU interfaces, e.g. E1 interface between its user and control plane functions.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects. With the cloud, the RAN and core could be also fully or partially in same cloud element(s). Also an N2 and/or other interfaces could be substituted with data repository etc.

The computer readable memories 125, 155 and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 710, base station 770, and other functions as described herein.

In general, the various embodiments of the user equipment 110 can include, but are not limited to, cellular telephones such as cellular phones, smart devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. In addition, various embodiments of the user equipment include machines, communicators and categories of equipment, which are not primarily or not at all in use by human interaction.

Embodiments herein may be implemented in software (executed by one or more processors), hardware (e.g., an application specific integrated circuit), or a combination of software and hardware. For example, in an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, as in FIG. 1 for example. A computer-readable medium may comprise a computer-readable storage medium (e.g., memories 125, 155, 171 or other device) that may be any media or means that can contain or store the instructions for use by or in connection with an instruction execution system, apparatus, or device, such as a computer.

The current 3GPP Release 8 based architecture in LTE networks is fully distributed in the radio and fully centralized in the core network. The low latency requires bringing the content close to the radio which leads to local break out and multi-access edge computing (MEC). 5G (and evolved LTE connected to 5G core) may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

Regarding RNA and core location updates in RRC Inactive state, the core network provides 5G RAN with RRC Inactive assistance information. The information contains among other things the UE's Registration area and Periodic registration area timer. The 5G RAN assigns the UE with RAN notification area (RNA) which is (meaning it contains the cells of or it can also include RAN area list instead of cell list) the registration area or subset of it. The RAN uses the RNA to page the UE in it when the UE is in RRC Inactive state.

When UE is in RRC inactive state, it shall make RNA update either when it leaves the RNA area, such that it enters a cell that is not part of the RNA assigned for it (or when UE moves out of defined RAN areas, which is similar, rather than in core network registration area update procedure), or upon expiry of the periodic RAN Notification Area Update timer.

When UE is registered in core NW, it shall make registration requests towards core network (AMF) upon changing to new (cell in) Tracking Area outside the UE's Registration area or upon expiry of periodic registration update timer (when UE is requested to make periodic registrations (location updates).

Additionally, for N2 Notification procedure/AMF requested NG-RAN location reporting, to support the UE's location information more stringently (e.g. cell information for emergency calls), per request once, periodically, or with regards to "Area of Interest", the RAN may report UE's location (cell, TAI) and other needed UE information to core NW (AMF) as requested.

Figure 2:
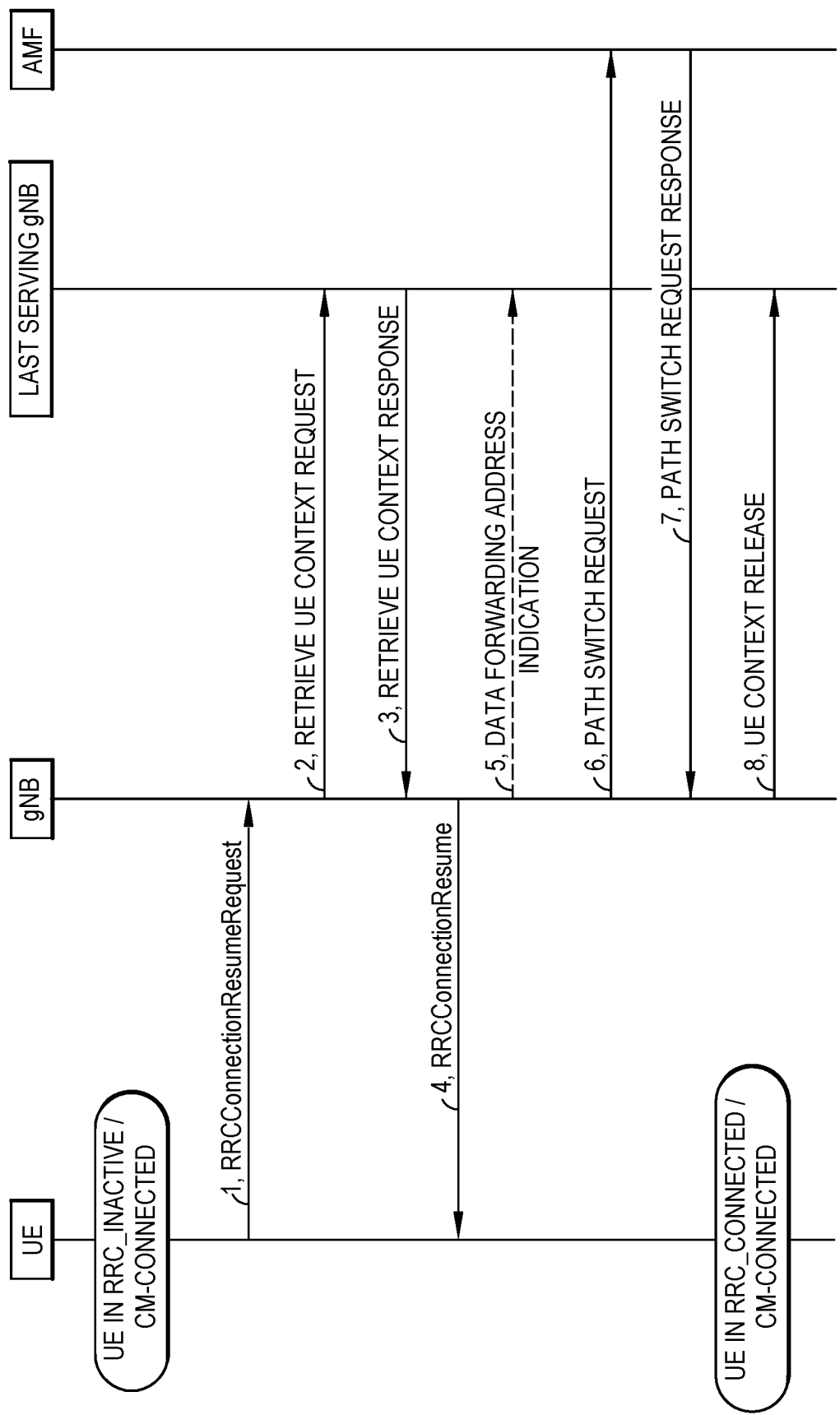
FIG. 2 is a schematic of a UE triggered transition from RRC_INACTIVE to RRC_CONNECTED.

FIG. 2 shows UE triggered transition from RRC_INACTIVE to RRC_CONNECTED where: (1) The UE resumes from RRC_INACTIVE, providing the I-RNTI, allocated by the last serving base station; (2) The base station, if able to resolve the base station identity contained in the I-RNTI, requests the last serving base station to provide UE Context data; (3) The last serving base station provides UE context data; (4) The base station completes the resumption of the RRC connection; (5) If loss of DL user data buffered in the last serving base station shall be prevented, the base station provides forwarding addresses; (6/7) The base station performs path switch; and (8) The base station triggers the release of the UE resources at the last serving base station.

Figure 3:
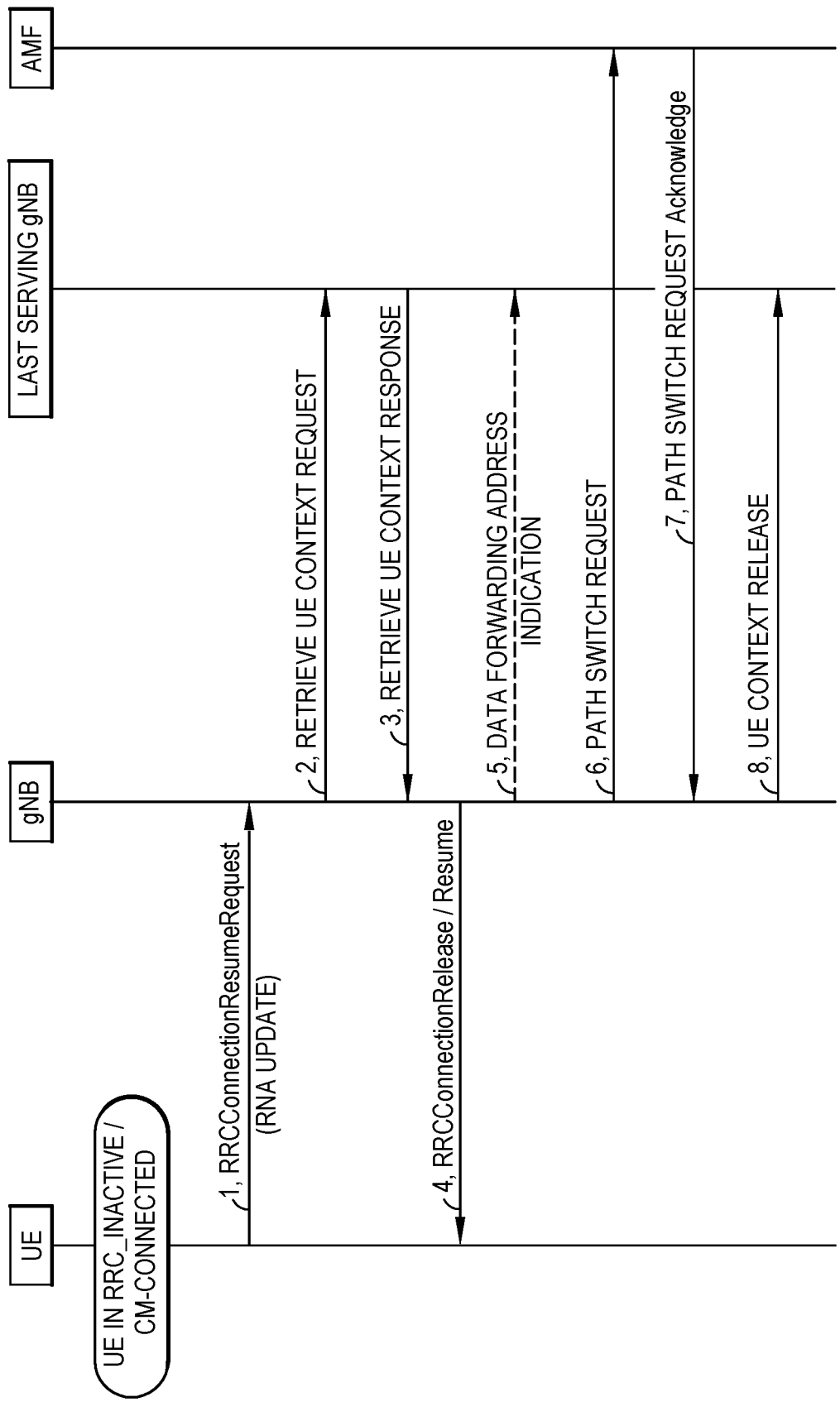
FIG. 3 is a schematic of an RNA Update.

FIG. 3 shows an RNA Update where: (1) The UE resumes from RRC_INACTIVE, providing the I-RNTI allocated by the last serving base station and appropriate cause value, e.g., RAN notification area update; (2) The base station, if able to resolve the base station identity contained in the I-RNTI, requests the last serving base station to provide UE Context; (3) The last serving base station provides UE context; (4) The base station may move the UE to RRC_CONNECTED, or send the UE back to RRC_INACTIVE state or send the UE to RRC_IDLE. (Note a problem in current 3GPP 38.331 is that RAN will move the UE directly back to RRC inactive and then the UE would need to do new request for a registration area update. Without changing this, the network does not have any reason to move the UE back to RRC connected in RNA update procedure.) If the UE is sent to RRC_IDLE, the following steps are not needed; (5) If loss of DL user data buffered in the last serving base station shall be prevented, the base station provides forwarding addresses; (6/7). The base station performs path switch; and (8) The base station triggers the release of the UE resources at the last serving base station.

Figure 4B:
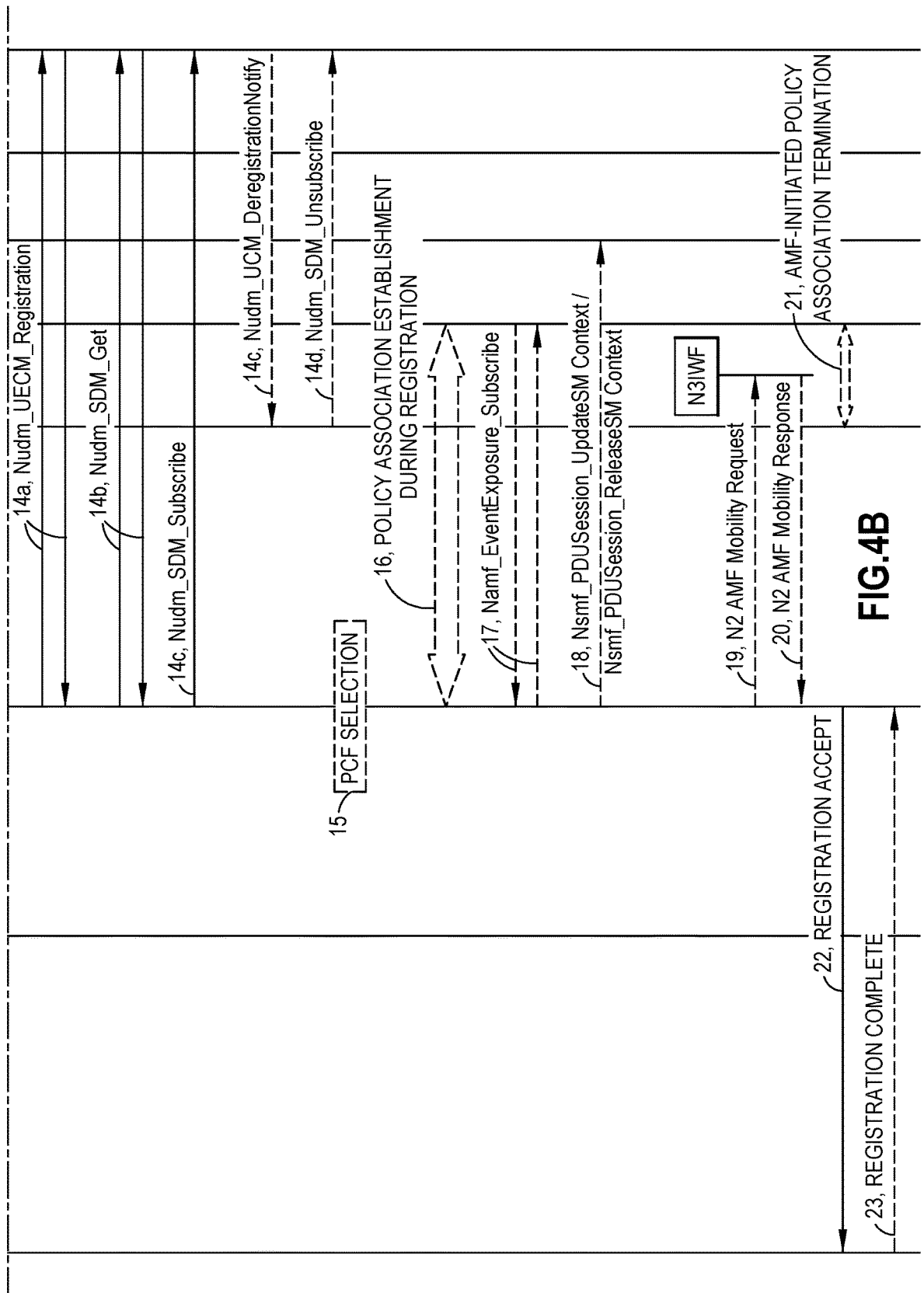
FIG. 4 is a schematic of Core NW Registration.

Regarding core NW registration, FIG. 4 shows the complete UE Registration procedure. The complete registration flow is not needed with location update for a UE that is already registered. However. FIG. 4 does not show AMF re-allocation but it may be carried as part of the registration if the AMF does not serve the UE's new location (Tracking area).

A problem solved by the current invention is that, when a UE moves to new RNA and new TA, it needs to perform both RNA update and registration update. Additionally, the same problem could also happen if the UE has the same timer value for RNA and TA/registration area update.

Currently 3GPP does not clearly specify how this can be done. If a UE would make first registration update it would lead to loss of old inactive UE context as a new base station would not be able to identify and connect the request. If that UE first makes an RNA update, then after that a new resume for UL data. However, this is very suboptimal because in the RNA update procedure the new base station only checks that the UE context is valid in the previous base station but does not move the UE context to the new base station. After an RNA update, the UE needs to perform a new resume for UL data and only this procedure moves the UE context from the previous base station to the new base station and moves the UE RRC connected, where the UE can initiate registration update.

In LTE, a UE performs TAU with uplink information transfer message when UE is in RRC connected mode or, if the UE comes from an RRC idle, then it combines it with an RRC Connection Setup Complete message In the present invention, the UE performs the RNA update with RRC resume and combines registration to that message. The network identifies the case and makes context move and after that registration update.

Another issue is that if UE context fetch is not successful from source base station, then the network shall move the UE to RRC connected mode and perform the registration and thereafter moves the UE RRC idle.

The RNA update (shown in FIG. 3 and discussed above) may coincide with core NW registration update (see FIG. 4, also discussed above) or other similar procedures such as "N2 Notification procedure/AMF requested NG-RAN location updating". To optimize such coinciding procedures, current invention puts these together with one procedure as follows:

First, initiate RRC Resume procedure as described FIG. 3.

Second, combine RRC Resume procedure with RRC RNA Update and NAS Registration. Interpret the first message in RRC Resume procedure (RRCResumeRequest) as RNA update, the request message can contain cause value explicitly indicating combined RNA update and core NW level NAS registration procedure. The RRCResumeRequest can contain RAN update related parameters. Include NAS Registration (or other similar) message in RRCResumeRequest and further providing it over N2 to AMF with NGAP Uplink NAS Transport (or other NGAP) message.

Third, alternatively interpret the third message (RRCResumeComplete) in the RRC resume procedure as combined RNA update, the complete message can contain cause value indicating RNA update and core NW level NAS registration request.

Lastly, RRCResume/Release could contain additional RNA information to be used by the UE in the new RNA and/or Tracking Area/Registration area from the core NW.

Note that the UE context can be retrieved from last serving base station and Path Switch procedure towards core NW carried out, if the last serving base station is not the new/current base station Additionally, the core NW could provide back e.g. answer message which could be conveyed in SRB or embedded in RRCResume/Release message which is provided from RAN towards UE as reply.

Moreover, the RNA and registration location updates may be due to entering new cell which is not part of current RNA and/or TA, or due to periodic RNA/registration update.

The RNA update (shown in FIG. 3 and discussed above) may coincide with core NW registration update (see FIG. 4, also discussed above) or other similar procedures such as "N2 Notification procedure/AMF requested NG-RAN location updating". To optimize such coinciding procedures, current invention puts these together with one procedure as follows:

First, initiate RRC Resume procedure as described FIG. 3.

Second, combine RRC Resume procedure with RRC RNA Update and NAS Registration. Interpret RRCResumeRequest as RNA update, the request message can contain cause value explicitly indicating combined RNA update and core NW level NAS registration procedure. The RRCResumeRequest can contain RAN update related parameters. Include NAS Registration (or other similar) message in RRCResumeRequest and further providing it over N2 to AMF with NGAP Uplink NAS Transport (or other NGAP) message.

Lastly, RRCResume/Release could contain additional RNA information to be used by the UE in the new RNA and/or Tracking Area/Registration area from the core NW.

Note that the UE context can be retrieved from last serving base station and Path Switch procedure towards core NW carried out, if the last serving base station is not the new/current base station Additionally, the core NW could provide back e.g. answer message which could be conveyed in SRB or embedded in RRCResume/Release message which is provided from RAN towards UE as reply.

Moreover, the RNA and registration location updates may be due to entering new cell which is not part of current RNA and/or TA, or due to periodic RNA/registration update.

Figure 5:
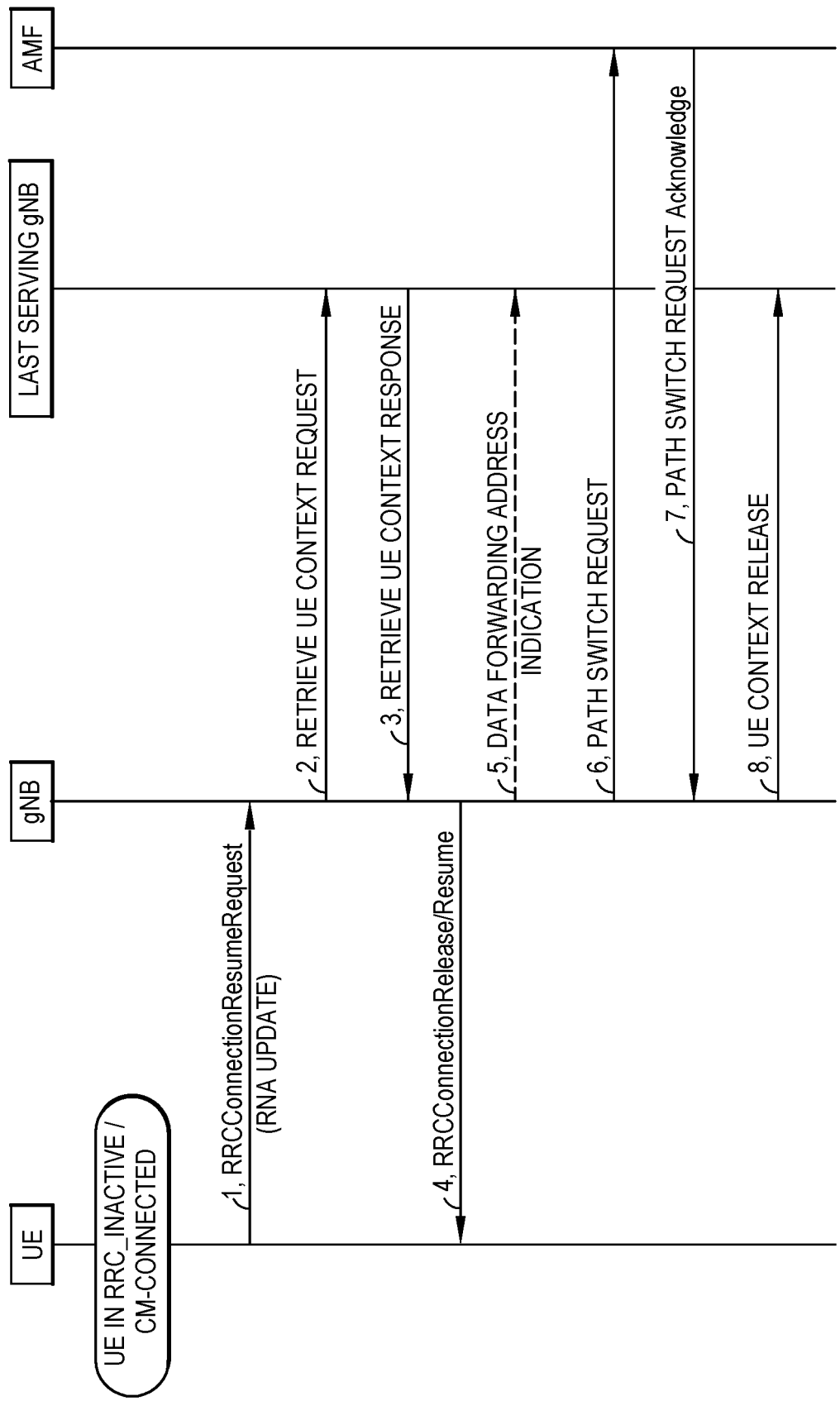
FIG. 5 through FIG. 16 are schematics of exemplary embodiments of an apparatus of the present invention.
Figure 6:
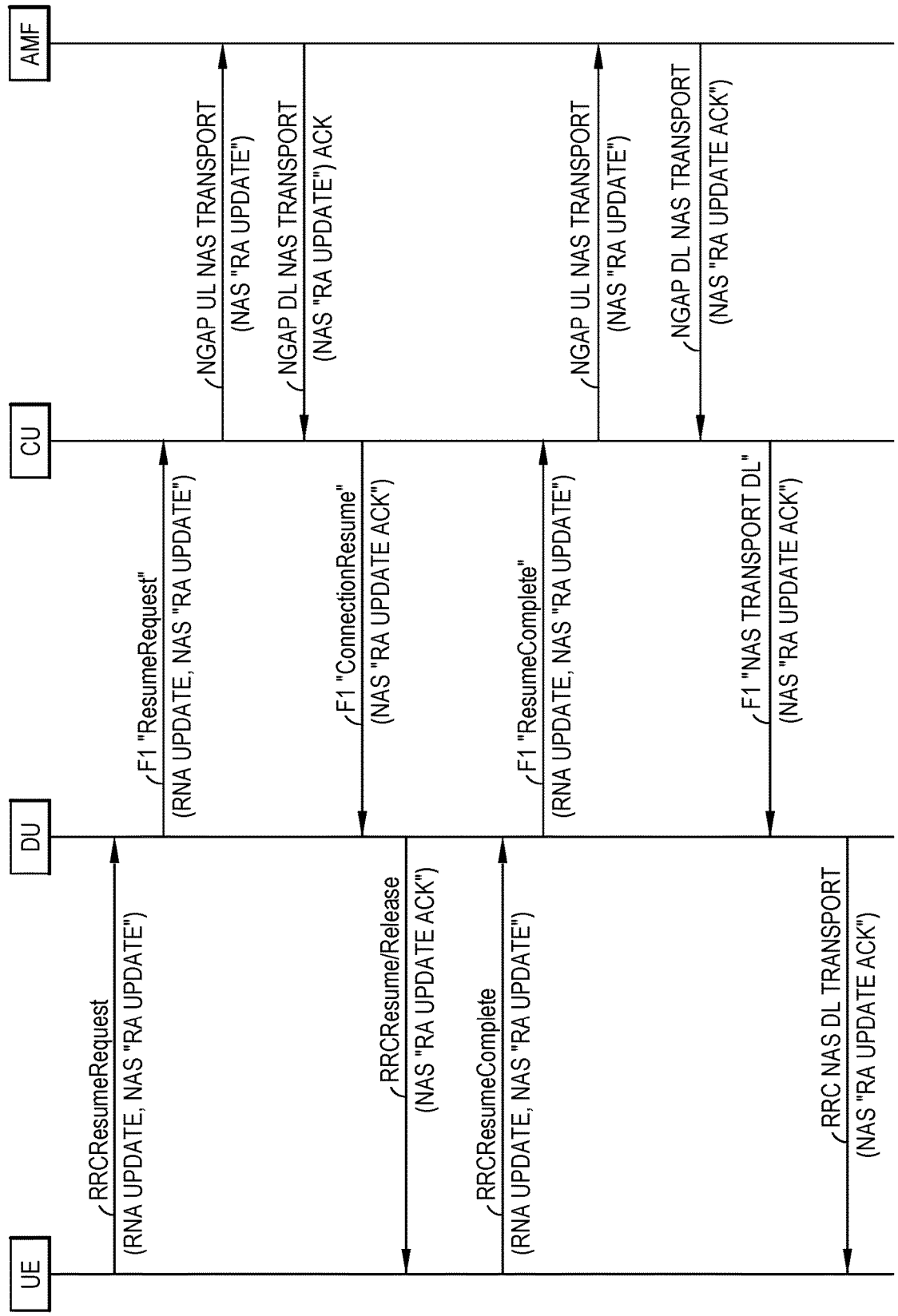
Figure 7:
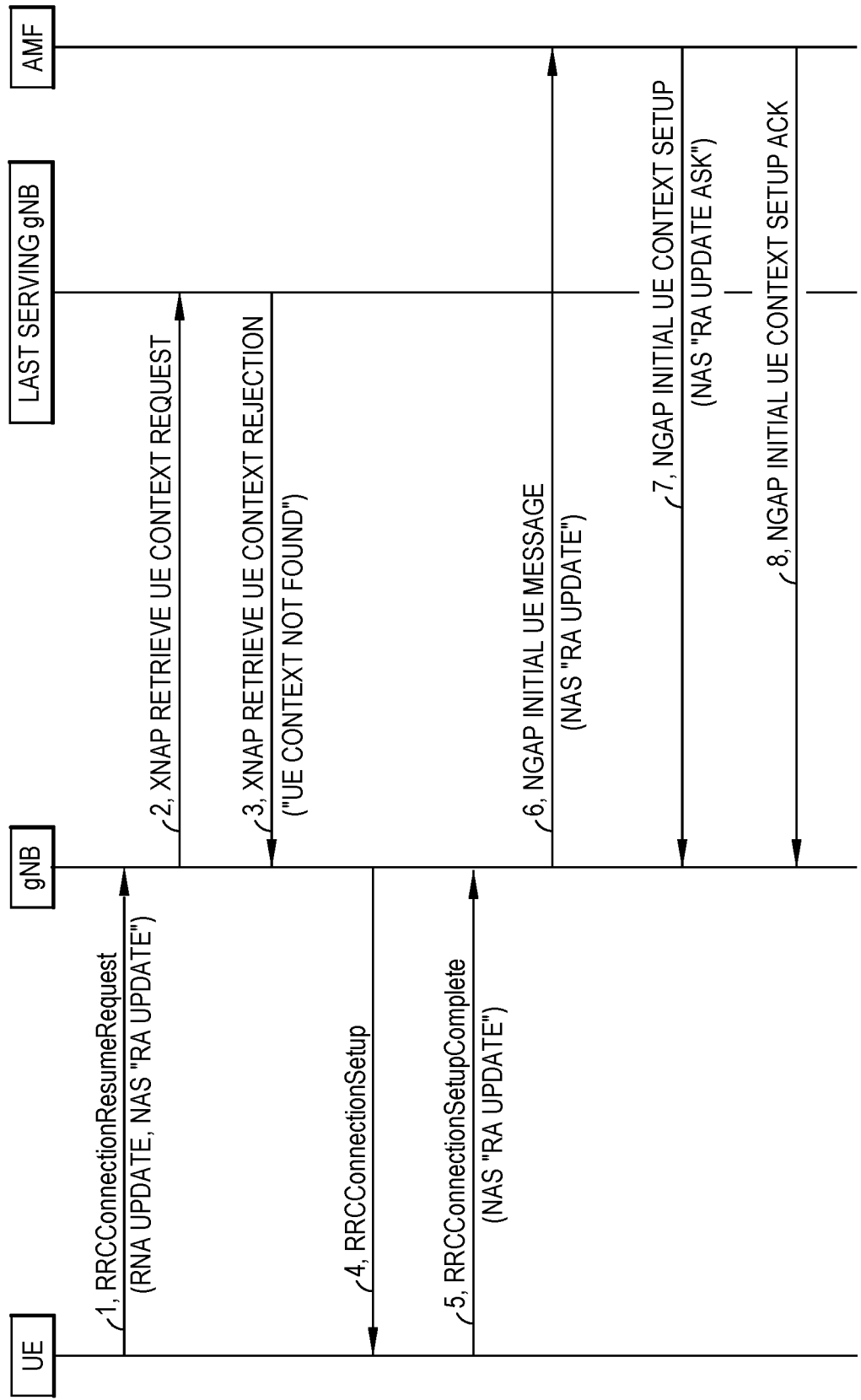

FIG. 5, FIG. 6, and FIG. 7 present signaling flows for the various cases. For simplicity, the cases describe the situations in which the RNA and TAI/RA (Registration area) changes. With periodic RNA & RA update, the updating can happen without RNA/RA change. The flows are equal in such case apart from some minor differences in procedure details.

Additional flows which are not explicitly included are the following: DU change without CU change within base station; AMF change, if AMF is changed, UE information is retrieved from previous AMF, UDM is updated with UE's new location, etc. (for more information see 3GPP TS 23.502); and UPF change (again, please 3GPP TS 23.502).

Otherwise the flows show RA update but messages between base station CU and DU are mostly omitted for simplicity. Also for the sake of simplicity, all generic functionality related to the procedures, e.g. all messages may not be included in the figures.

In FIG. 5, the base station is changed, UE context retrieved from the last serving base station. As such, the UE's RNA & TA changes without RAN DU, RAN CU, and AMF changing.

RRCRequest may contain specific cause code value indicting that this is combined RNA & registration update. RRCResume (Release) may contain information on acknowledgement on the RNA change as well as additional information related to the new RNA. In addition, UE may retrieve such info via SIB s etc. The NAS registration update message is included in RRC message as "DedicatedNASInfo" IE. This is most optimal from air interface signaling point of view. In addition, it is less error prone as the NAS message is not lost if target the base station does not recognize it, for instance, if the UE context is not successfully retrieved from the last serving base station. NAS level acknowledgement is returned within RRCConnectionResume or as independent RRC Downlink Transport, or in other relevant message.

In step 1, the base station records a new RNA for the UE. Information about NAS level registration is indicated with a separate NAS message included in the RRC message, as an IE (or several IEs) in an RRC message, or deduced from the fact that RNA (cell) changes, for instance, if RNA area equals Registration area. NAS Registration may be sent to the AMF as its own message using existing NGAP context with NGAP UL NAS Transport or combined with another NGAP message such as Path Switch Request.

In step 4, the RNA and/or RA change is acknowledged as IE(s) with the RRC message and/or NAS message. Additional related information can also be provided to the UE.

In step 6, new TAI/RA (cell) is recorded if not done previously in AMF and other core NW elements as needed (including HSS, PCRC/PCF, applications etc.). The new TAI/RA is indicated as separate NAS message or as one (or more) IE(s) within Path Switch Request. Possible related additional information may be returned to UE in NGAP and RRC acknowledge message or as separate NGAP and RRC messages, with incorporated NAS message or as IE(s) in NGAP and RRC messages.

Note that the order of the messages may vary, for instance, step 4 could be after step 7.

In FIG. 6, the base station is not changed. As such, the UE's RNA & TA changes without RAN DU, RAN CU and AMF change. With the same base station, the CU, for example, is also supporting the new NRA & TA as shown in FIG. 5.

If UE is moved to RRC idle, then RRCResumeComplete is not sent. If UE is moved to RRC Connected mode then the RRCResumeComplete is sent. Sending of RRC NAS DL Transport depends on whether it is needed to send the NAS level ack, e.g. if sent already in RRResume/Release, then could be omitted. NAS "RA Update" may be sent in RRCResumeRequest and/or in RRCResumeComplete message(s). "RA update ack" may be sent in either RRCresume/release and/or in "RRCNASDLTransport" message(s).

FIG. 7 shows the error case with a base station change, such that the UE context fetch from last serving base station fails. As such, a new RRC connection and NGAP context to core NW is established. Here the UE's RNA & TA changes without RAN DU, RAN CU, and AMF changing.

In step 4, as the UE context is not successfully retrieved from last serving base station, the base station needs to setup the RRC Connection with RRCConnectionSetup. In step 6, the AMF (and other needed core NW elements and functions) records the UE's new RA, establishes UE context towards new base station, and removes context towards last serving base station, if it still exists. See FIG. 6 for additional notes and actions related to RNA/RA.

FIG. 8 through FIG. 13 give more detailed flows. The "NAS message "in NGAP or RRC can be NAS registration request, NAS registration accept or NAS registration complete (las is conditional message) PDU, or another NAS message, or NAS like information included as information elements in RRC and/or NGAP messages replacing or providing additional information to the NAS message.

Case 1: no gNB change and UE context found in the gNB: existing NGAP UE context between RAN and core NW can be used, e.g. NGAP Uplink NAS Transport including the NAS registration.

Case 2: gNB change and so UE context need to be fetched from previous gNB over Xn interface, here are 3 different cases w.r.t. to NGAP UE context:

(a) NAS message is sent to core NW with establishing new NGAP UE context between RAN and core NW with S-TMSI or other UE identity received in the RRC (resume request) message. This is can be done before the UE context is fetched from the previous gNB, e.g. by using NGAP Initial UE message and Initial context setup/Downlink NAS Transport procedure, or simultaneously with that fetching. The new UE NGAP context can be: (i) immediately removed after "NAS registration accept" (or other NAS message), and e.g. followed by NGAP Path Switch procedure; or (ii) the new NGAP context can be continued and used for Path Switch;

(b) The UE context is fetched first from the previous gNB and new NGAP context created between new gNB and core NW for the UE, e.g. with NGAP Path Switch procedure (and the old one removed). E.g. the NAS registration and registration accept messages are conveyed in NGAP Path Switch request and acknowledge messages, respectively, or as separate NGAP Uplink and Downlink NAS Transport messages using the already established NGAP UE context, respectively.

(c) NAS message is sent to core NW with establishing new NGAP UE context between RAN and core NW with S-TMSI or other UE identity received in the RRC (resume request) message by e.g. using NGAP Initial UE message and Initial context setup procedure. This is can be done even if UE context fetching from old gNB is not done or if the new gNB does not have UE context.

Case 3: If UE context is not found and RRC connection setup needs to be sent to the UE as response to the RRC resume req, then new UE NGAP setup to core NW needs to be established for the NAS signaling, e.g. with NGAP Initial UE message and Initial context setup procedure To overcome these issues, the present invention combines the RNA update and core NW registration with RRC Resume procedure. FIG. 8 through FIG. 13 detail the particular message flows with the combined RNA and NAS registration.

NAS registration request (and/or corresponding IEs) can be in an uplink RRC message, being conveyed as part of or in conjunction with the procedures to update the "RAN update" and carry out related actions, as "DedicatedInfoNAS" or other similar IE, examples: RRC Connection Resume Request; RRC Connection Resume Complete; RRC Connection Setup; RRC UL Information Transfer.

After NAS Registration request, NAS registration accept (and/or corresponding IEs) is in any subsequent downlink RRC message, following RRC message that conveyed the uplink NAS registration, as "DedicatedInfoNAS" or other similar IE, examples: RRC Connection Resume; RRC Connection Release; RRC Connection Setup Complete; RRC DL Information Transfer.

After NAS Registration Accept, NAS registration complete (and/or corresponding IEs) may follow as third step and be in an uplink RRC message, being conveyed as part of or in conjunction with the procedures to update the "RAN update" and carry out related actions, as "DedicatedInfoNAS" or other similar IE, examples: RRC Connection Resume Complete; RRC Connection Setup; RRC UL Information Transfer.

Figure 8:
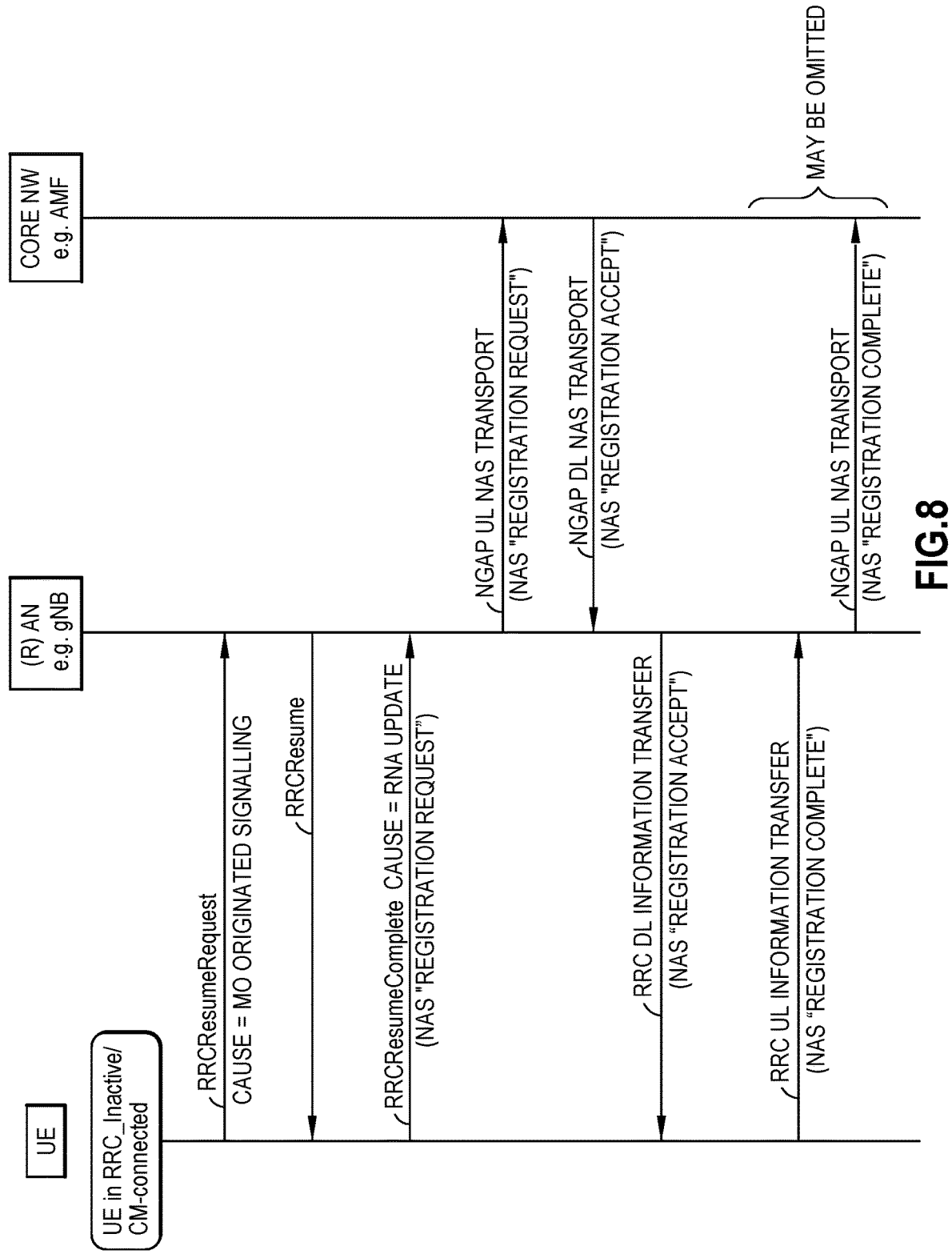

FIG. 8 shows the flows where the gNB is not changed with combined RNA and NAS registration.

Figure 9:
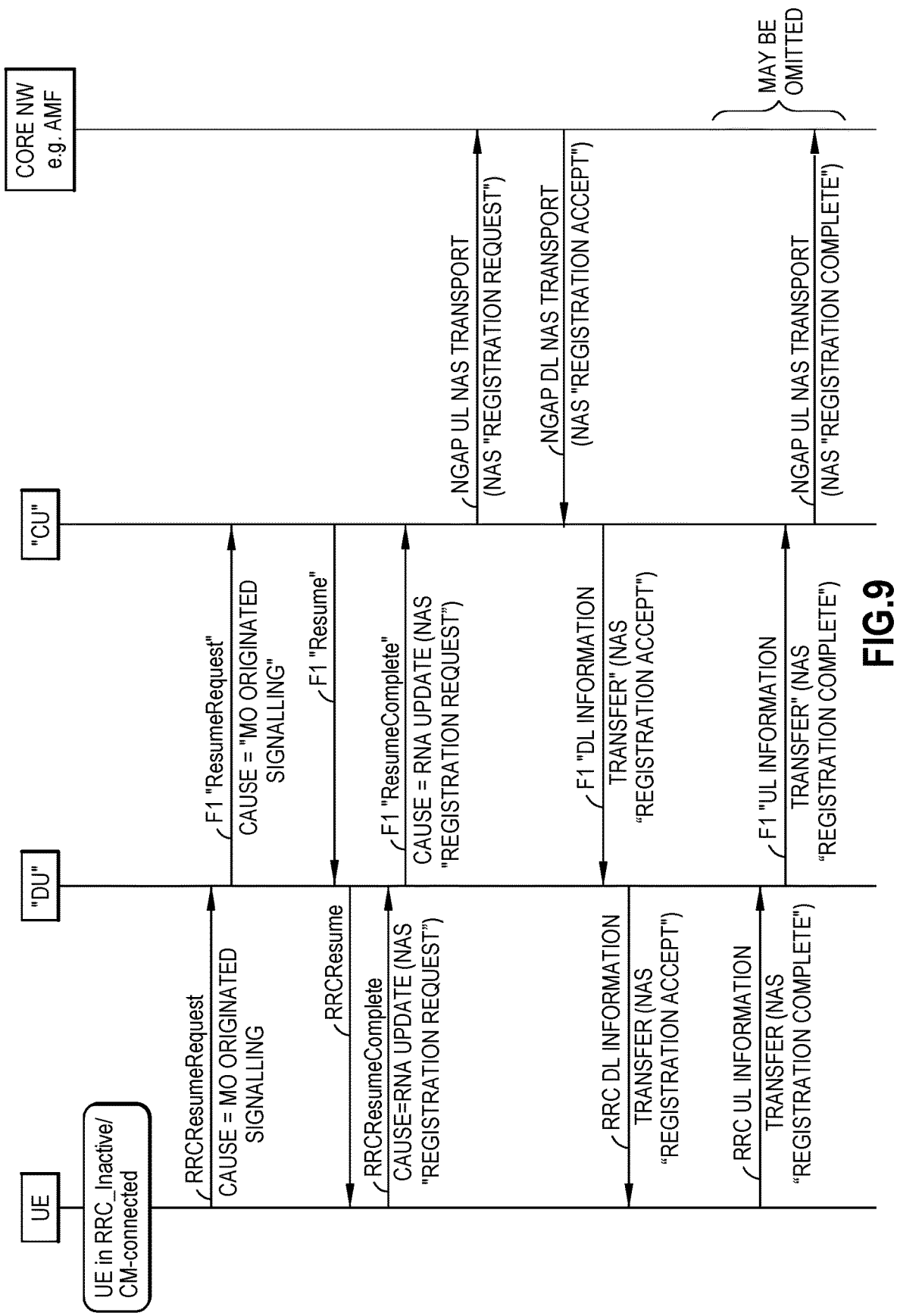

FIG. 9 shows the flows where the gNB is not changed with combined RNA and NAS registration.

Figure 10:
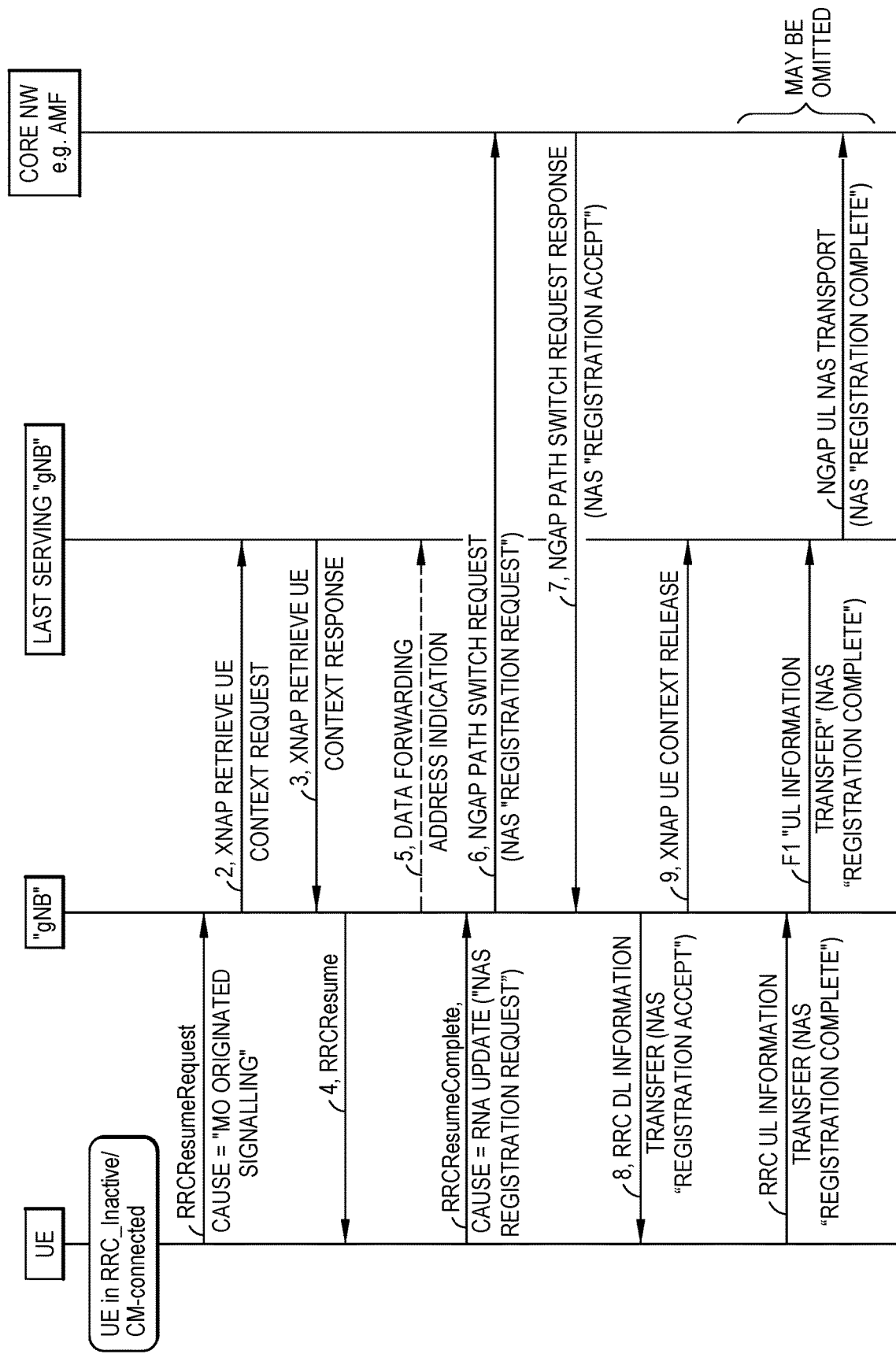

FIG. 10 shows the message flows were the gNB is changed with combined RNA and NAS registration.

Figure 11:
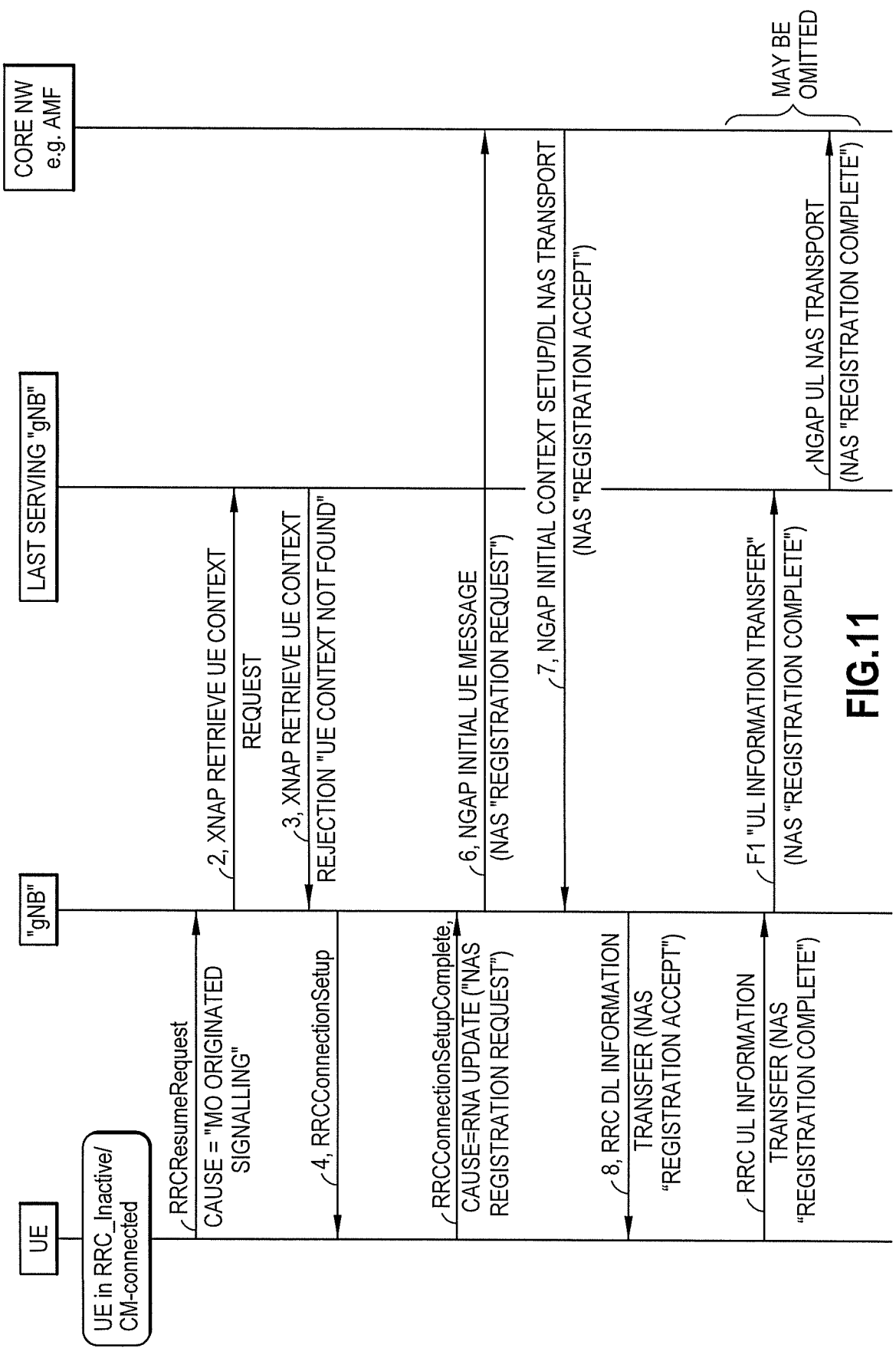

FIG. 11 shows the message flows where the gNB is changed with combined RNA and NAS registration; UE context not found.

Another option: note, especially in these options, the NAS messages can be sent as part of other needed RRC messages in UL and DL or as RRC UL/DL Information Transfer.

Figure 12:
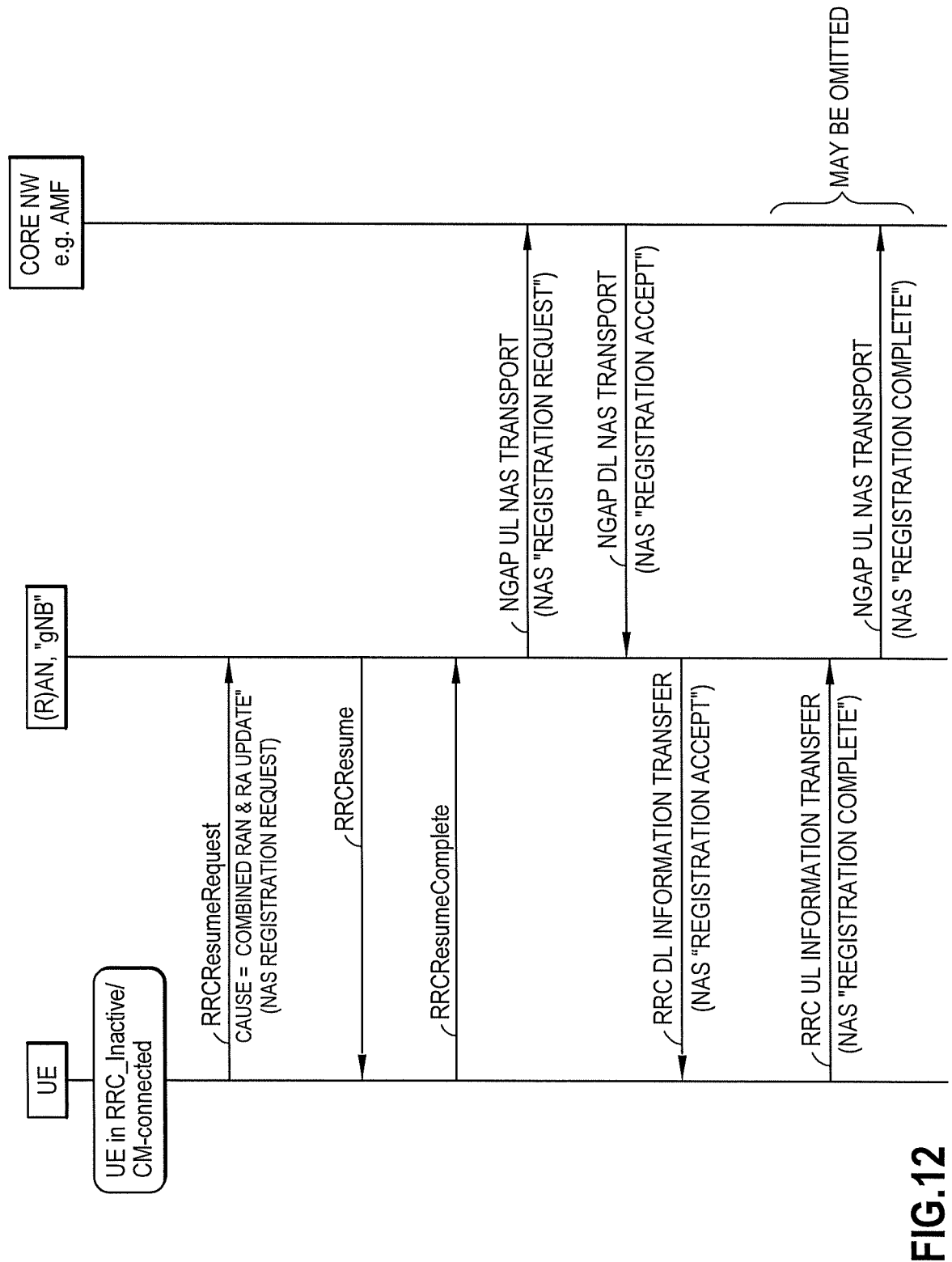

FIG. 12 shows the message flows where the gNB is not changed, with combined RNA and NAS registration.

Figure 13:
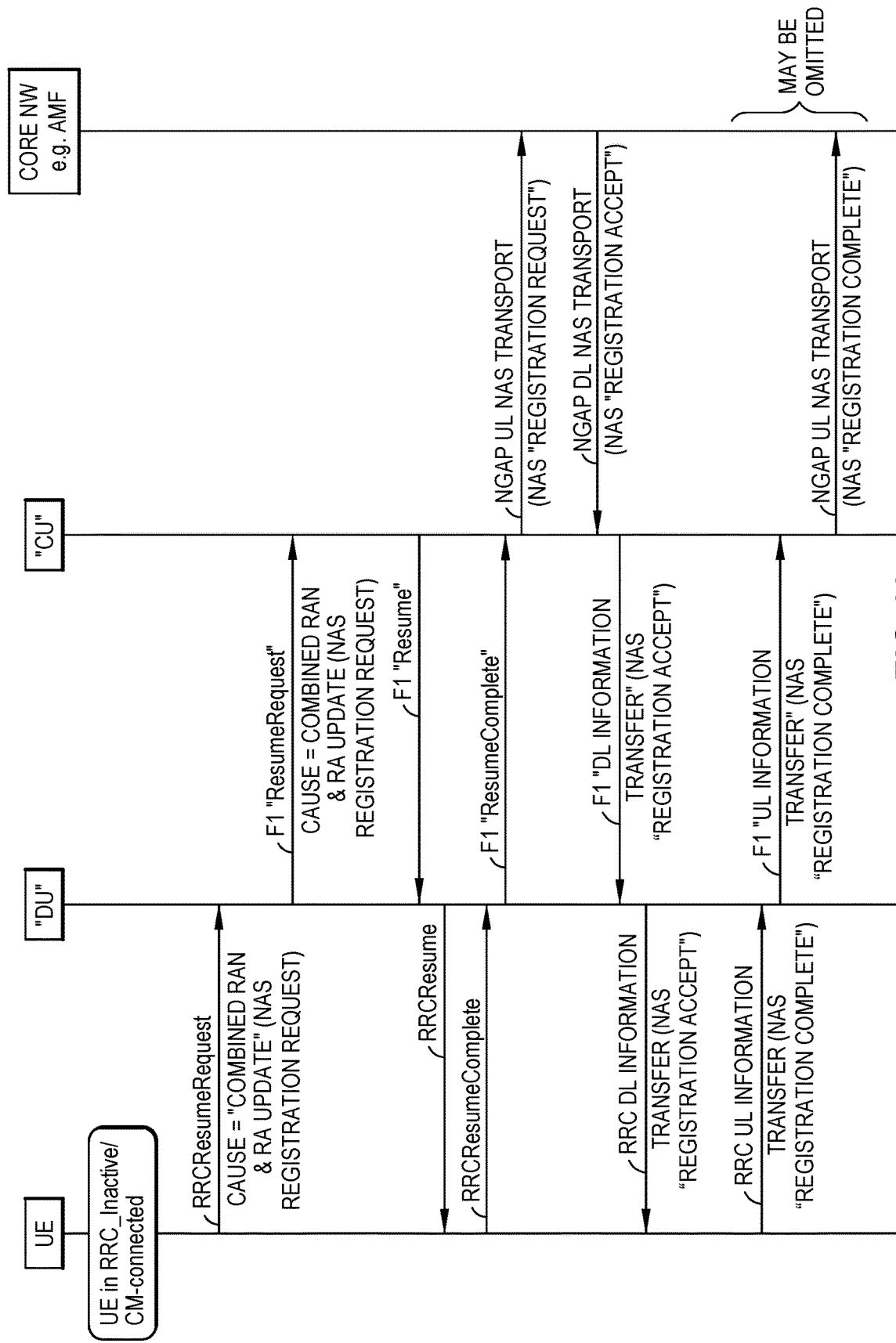

FIG. 13 shows the message flows where gNB is not changed, with combined RNA and NAS registration.

Figure 14:
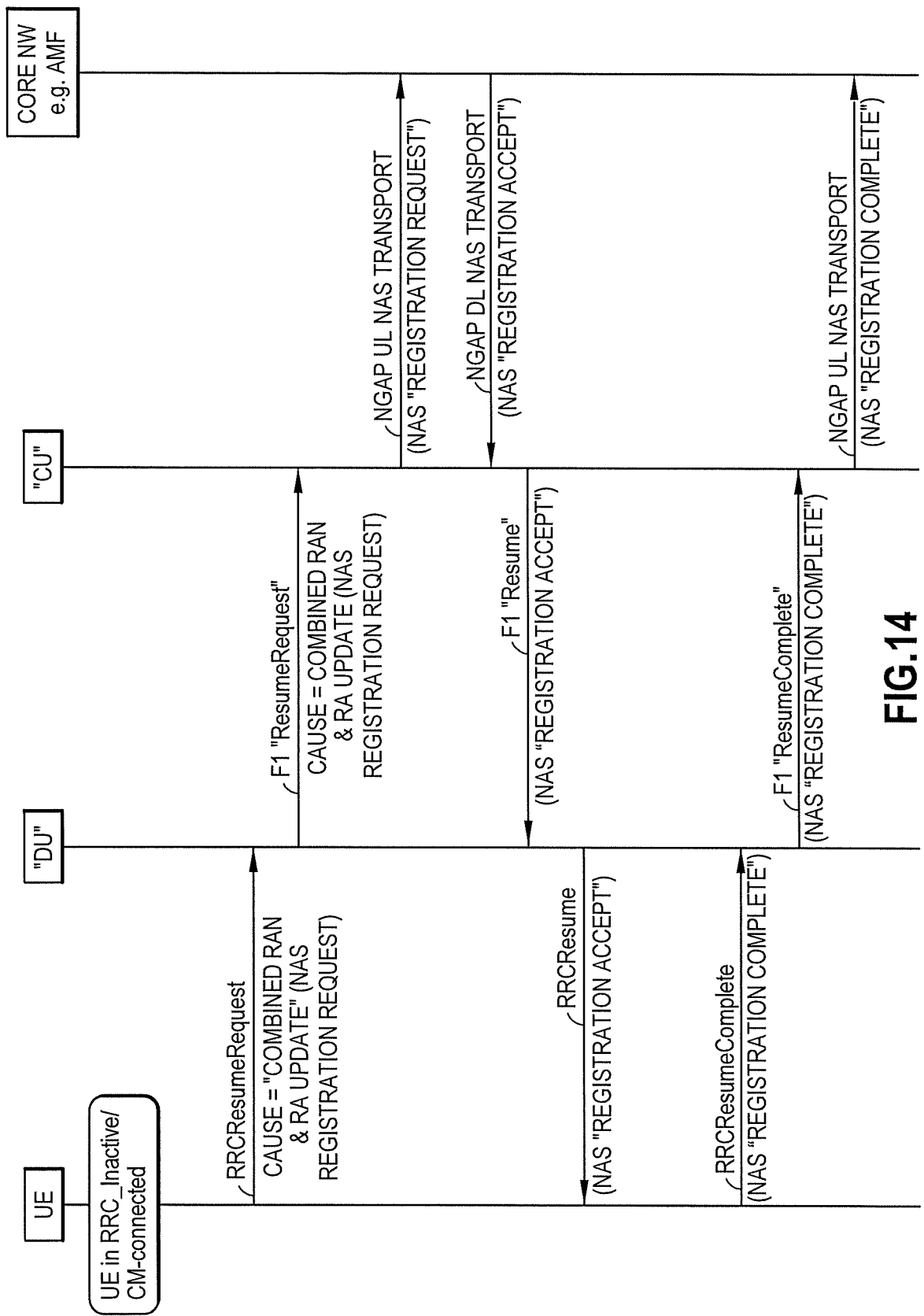

FIG. 14 shows the message flows where the gNB is not changed, with combined RNA and NAS registration. May be omitted: NAS registration complete in RRC Resume Complete and corresponding F1 message; NGAP UL NAS Transport with NAS "registration complete".

Figure 15:
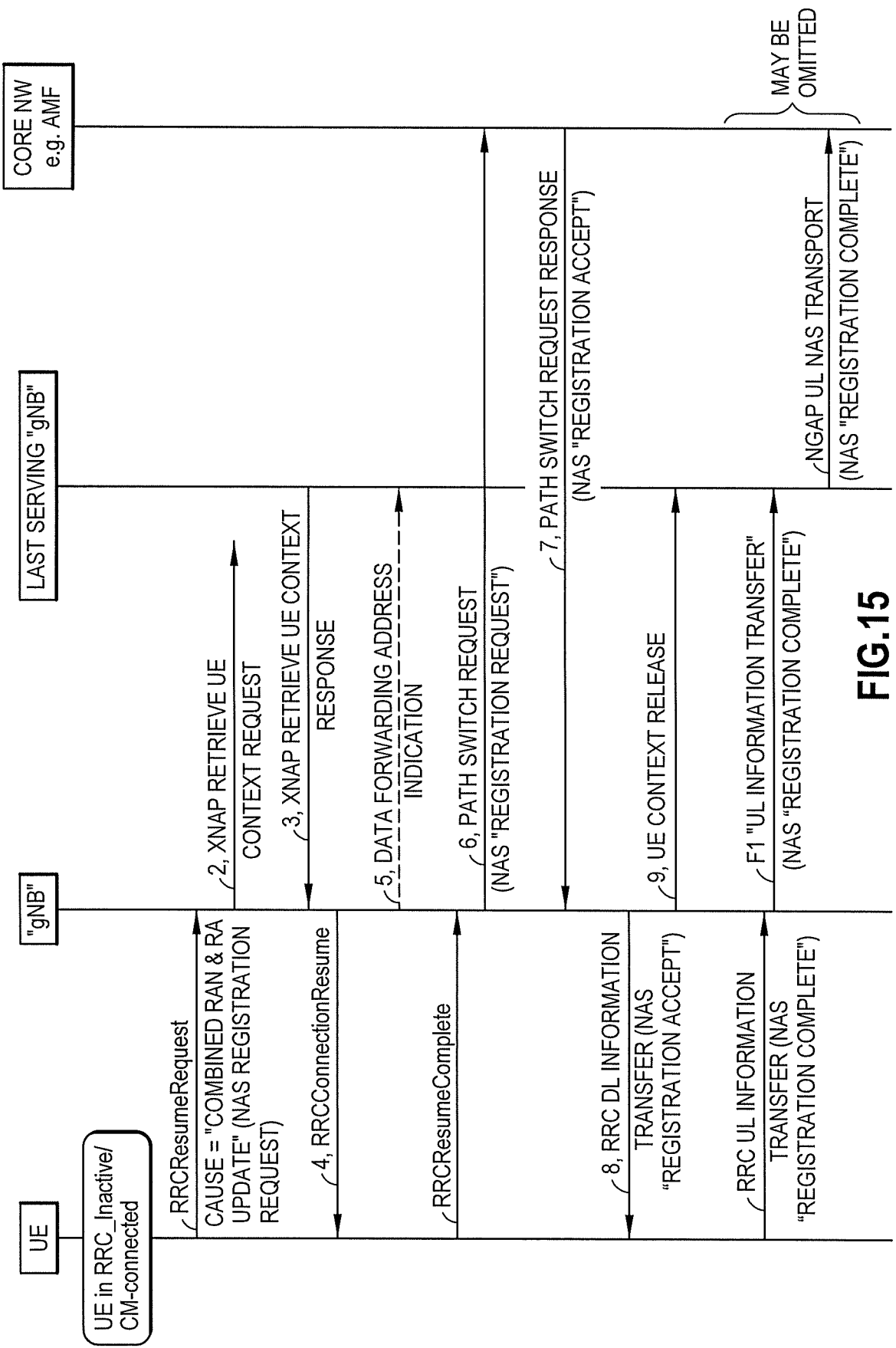

FIG. 15 shows the message flows were the gNB is changed with combined RNA and NAS registration.

Figure 16:
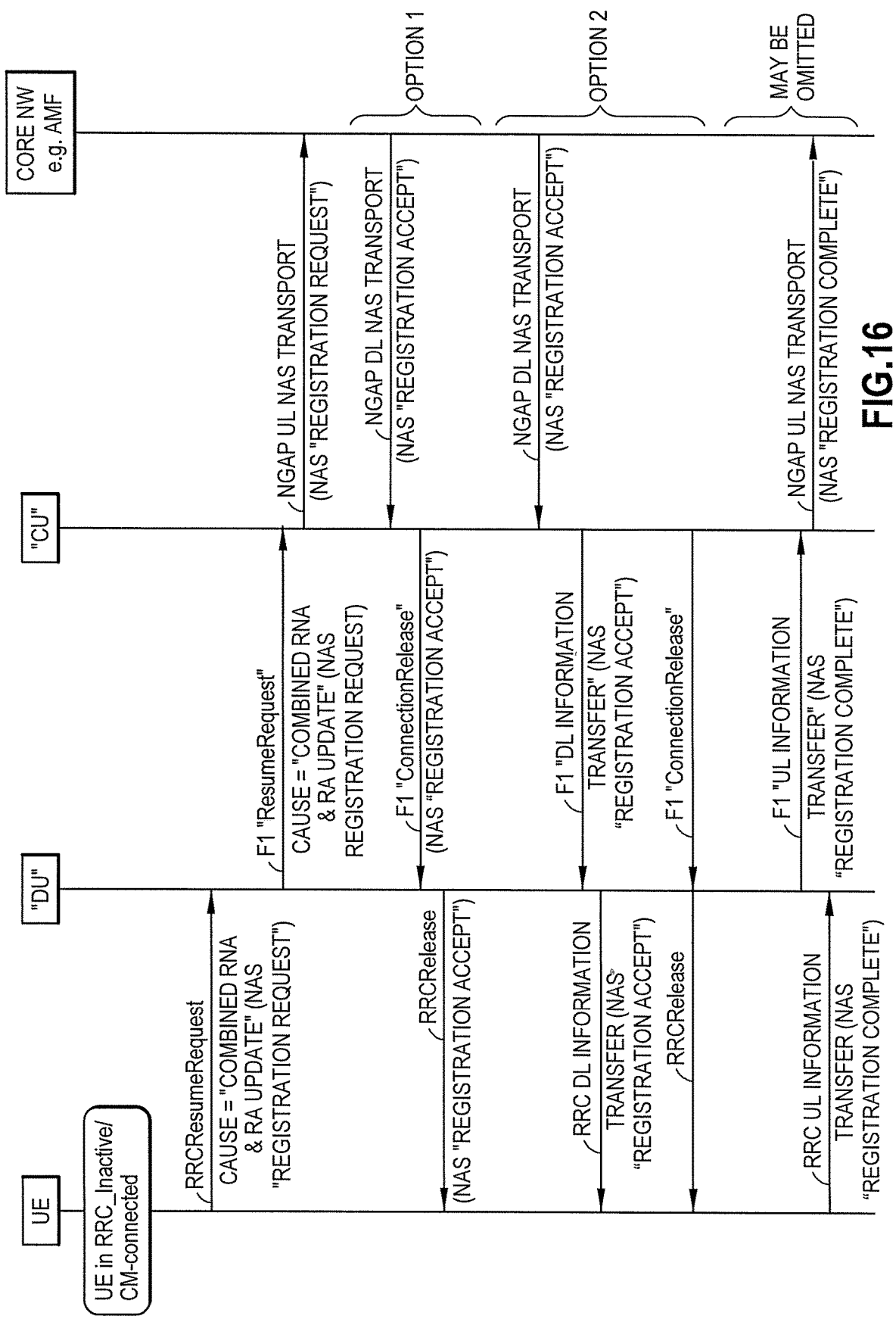
Figure 17:
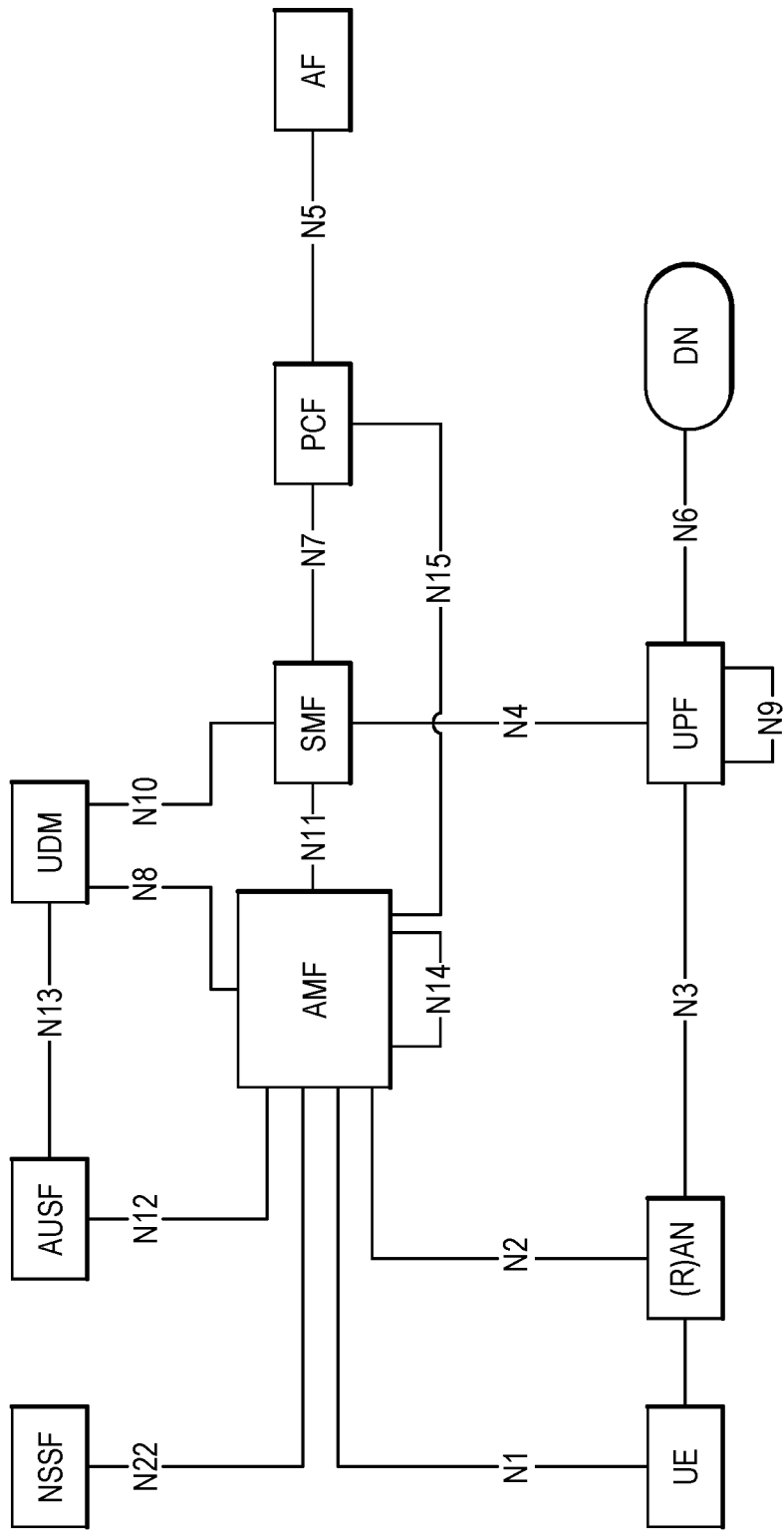
FIG. 17 is a block diagram of an example of 5G non-roaming architecture.

FIG. 16 shows the message flows were the gNB is not changed with combined RNA and NAS registration and shows that there are different options for combining the NAS messages with RRC messages Exemplary methods can be found in each on the message flow diagrams. The various processors, memories, and computer program codes, especially those found in the YYY modules and ZZZ modules described hereinabove would execute the method in the particular device. An apparatus comprising at least one processor and at least one memory including computer program code, wherein the at least one memory and the computer code are configured, with the at least one processor, would cause the apparatus to at least perform each of the steps of all the exemplary methods discusses herein. Moreover, a computer program product embodied on a non-transitory computer-readable medium in which a computer program is stored that, when being executed by a computer, could also be configured to provide instructions to control or carry out each and every step of each and every exemplary method discussed herein.

Furthermore, an apparatus with means for carrying out each and every step of each and every exempla method would be an aspect of the present invention as would a computer program with code for carrying out each and every step of each and every exemplary method would be an aspect of the present invention.

Although various aspects of the invention are set out in herein, other aspects of the invention comprise other combinations of features from the described embodiments and/or the dependent with the features of the manifestations, and not solely the combinations explicitly set out in the claims.

Below are presented several manifestations of the present invention where different signaling is shown for each depending on the scenario. The first manifestation shows an exemplary method where there is an RNA change with immediate inactive after context fetch and delivery of NAS message to the core network. This procedure, denoted as manifestation 1, like manifestations 2, 3 ,4, and 5, which follow, may also be used in gNB internal in a case where the gNB is split to several RNAs:

1. A method comprising:
    in response to changing base stations, receiving by BS2 from a UE served by BS1 an RCCResumeRequest,
        wherein the RRCResumeRequest comprises:
            parameters related to the RAN update
            a cause value indicating a combined RNA update,
            a NAS Registration message, and
            wherein the RCCResumeRequest is interpreted as an RNA update;
    sending by BS2 a Retrieve UE Context Request to BS1;
    obtaining by BS2 from BS1 a UE Context Response; and
    transmitting by BS2 a Release to the UE.

The second manifestation is for an RNA with RRC connection. In this case, it is expected that RRC connection needs to be maintained for a while, for instance, for acknowledgement from the core network:

2. A method comprising:
    in response to changing base stations, receiving by BS2 from a UE served by BS1an RCCResumeRequest,
        wherein the RRCResumeRequest comprises:
            parameters related to the RAN update
            a cause value indicating a combined RNA update,
            a NAS Registration message, and
            wherein the RCCResumeRequest is interpreted as an RNA update;
    sending by BS2 a Retrieve UE Context Request to BS1;
    obtaining by BS2 from BS1 a UE Context Response;
    transmitting by BS2 an RCCResume to the UE;
    receiving RRCComplete from the UE;
    transmitting by BS2 a Release to the UE.

This third manifestation is for periodic RNA. This is similar to the first and second manifestations shown above and could actually have similar to those types of manifestations short and longer formats:

3. A method comprising:
    in response to a periodical RNA/RA update, receiving by a BS in the RNA from a UE served by BS1 an RCCResumeRequest,
        wherein the RRCResumeRequest comprises:
            parameters related to the RAN periodic update
            a cause value indicating a combined RNA periodic update,
            a NAS Registration message, and
            wherein the RCCResumeRequest is interpreted as an RNA update;
    in case BS1/=BS2 sending by BS2 a Retrieve UE Context Request to BS1;
    obtaining by BS2 from BS1 a UE Context Response; and
    transmitting by BS2 an RCCResume/Release to the UE.

This next manifestation, the fourth one, is in regard to RNA with RRC connection, namely, an NAS message in RRC resume complete. In this manifestations, a NAS message is delivered in the second UE message; so the UE is first moved to RRC connected and then the NAS signaling starts after that:

4. A method comprising:
    in response to changing base stations, receiving by BS2 from a UE served by BS1 an RCCResumeRequest,
        wherein the RRCResumeRequest comprises:
            parameters related to the RAN update
            a cause value indicating a combined RNA update,
            wherein the RCCResumeRequest is interpreted as an RNA update;
    sending by BS2 a Retrieve UE Context Request to BS1;
    obtaining by BS2 from BS1 a UE Context Response; and
    transmitting by BS2 an RCCResume to the UE.
    receiving RRCResumeComplete from the UE with a NAS Registration message transmitting by BS2 a Release to the UE.

In this fifth manifestation, any type of NAS message in RRC resume complete, for instance, UL NAS transport message, is shown, which could be combined with the above manifestations:

5. A method comprising:
    in response to changing base stations, receiving by BS2 from a UE served by BS1 an RCCResumeRequest,
        wherein the RRCResumeRequest comprises:
        parameters related to the RAN update
        a cause value indicating a combined RNA update,
        wherein the RCCResumeRequest is interpreted as an RNA update;
    sending by BS2 a Retrieve UE Context Request to BS1;
    obtaining by BS2 from BS1 a UE Context Response; and
    transmitting by BS2 an RCCResume to the UE.
    receiving RRCResumeComplete from the UE
    receiving UL NAS transport message from the UE
    transmitting by BS2 a Release to the UE.

In this sixth manifestation, the messaging between the UE and BS2 is as follows, which could be combined with the above manifestations:

6. A method comprising:
    wherein the RRCResumeRequest comprises:
        a cause value indicating e.g. "mo originated signaling", wherein the RRCResumeComplete comprises:
    parameters related to the RAN update and/or
    a cause value indicating a RNA update,
    NAS Registration Request,
        wherein the RCCResumeComplete is interpreted as an RNA update;
sending by BS2 to AMF the NAS registration request in NGAP UL NAS Transport message
obtaining by BS2 the NAS registration accept in NGAP DL NAS Transport; and
transmitting by BS2 an RRC DL Information Transfer to the UE; and possibly
obtaining by BS2 from UE RRC UL Information Transfer message or other RRC message with NAS registration complete message from UE in; and
transmitting by BS2 to AMF NGAP UL NAS Transport or other NGAP message with NAS registration complete message.

In this seventh manifestation, the messaging between the UE and BS2 is as follows, which could be combined with the above manifestations:

7. A method comprising:
wherein the RRCResumeRequest comprises:
    a cause value indicating e.g. "mo originated signaling",
wherein the RRCResumeComplete comprises:
    parameters related to the RAN update and/or
    a cause value indicating a RNA update,
    NAS Registration Request,
        wherein the RCCResumeComplete is interpreted as an RNA update;
sending by BS2 a Retrieve UE Context Request to BS1;
obtaining by BS2 from BS1 a UE Context Response; and
sending by BS2 to AMF the NAS registration request in NGAP Path Switch request or other NGAP message
obtaining by BS2 the NAS registration accept in NGAP Path Switch request response or in other NGAP message; and
transmitting by BS2 an RRC DL Information Transfer containing the NAS registration accept to the UE; and possibly
obtaining by BS2 from UE RRC UL Information Transfer message or other RRC message with NAS registration complete message from UE in; and
transmitting by BS2 to AMF NGAP UL NAS Transport or other NGAP message with NAS registration complete message.

In this eighth manifestation, the messaging between the UE and BS2 is as follows, which could be combined with the above manifestations:

8. A method comprising:
wherein the RRCResumeRequest comprises:
    a cause value indicating e.g. "mo originated signaling",
    wherein the BS2 sends XNAP Retrieve UE context request to BS1, and
    wherein the BS1 replies to BS2 with XNAP Retrieve UE context rejection with "UE context not found", and
wherein BS2 sends RRC Connection Setup to the UE, and UE responds to BS2 with RRC Connection Setup Complete comprises:
    parameters related to the RAN update and/or
    a cause value indicating a RNA update, and
    NAS Registration request,
wherein BS2 sends to AMF NGAP Initial UE message comprises
    NAS Registration Request
        wherein the RRC Connection Setup Complete is interpreted as an RNA update;
sending by AMF a NGAP Initial UE context Setup or NGAP DL NAS Transport message with NAS Registration Accept to BS2; and
sending by BS2 RRC DL Information Transfer with NAS Registration accept to UE, and possibly
obtaining by BS2 from UE RRC UL Information Transfer message or other RRC message with NAS registration complete message from UE in; and
transmitting by BS2 to AMF NGAP UL NAS Transport or other NGAP message with NAS registration complete message.

The above manifestations may contain "RNA update accept" with possibly related information as separate parameter(s) or information indicating from BS2 to UE that the update is accepted.

BS2, UE, and core network AMF typically record the RNA update and Registration update and carry out related actions such as saving the information, setting supervision timer(s), etc. these are already explained in current specifications and not repeated here. Also different implementations may have additional functionality or omit or replace some actions.

The descriptions focus on the functionality between a) the BS and UE, b) BS2 and core network (AMF), c) BS1 and BS2 (when applicable) and d) the NAS signaling between core NW AMF and UE (via BS2), and to some extent functionality by UE, BS1, BS2 and core NW AMF. All the internal aspects of entities such as BS2 (or BS1) or core network are not explained, e.g. within BS2 there can be many internal interfaces, e.g. F1, E1, and many others. Those are not important from the invention perspective and mostly not described. Some possible example behavior of F1 interface is depicted but message names and functionality can be different as there can be many variants of F1 interface. Also some existing well known functionality not directly related to the invention is not described, e.g. removing the NGAP context between BS1 and core NW AMF when the UE context is fetched to the new BS2 (gNB). In addition, the current 5G node names and message names are examples, and are used but those are not binding in the sense that the essence of the invention can be used for other (radio) access technologies and with other similar messages.

Although various aspects are set out above, other aspects comprise other combinations of features from the described embodiments, and not solely the combinations described above. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes examples of embodiments of the invention, these descriptions should not be viewed in a limiting sense. Rather, there are several variations and modifications which may be made without departing from the scope of the present invention as defined in the appended claims.

The invention claimed is:

1. An apparatus comprising:
at least one processor; and
at least one memory including computer program code, wherein the at least one memory and the computer code are configured, with the at least one processor, to cause the apparatus to at least:
receive a radio resource control (RRC) message from a user equipment, wherein the RRC message is sent by the user equipment when resuming from an RRC inactive state to an RRC connected state, the RRC message combining a radio access network notification area (RNA) update with a core network level non-access stratum (NAS) registration procedure; and
send an RRC response message to the user equipment.

2. The apparatus of claim 1, wherein the RRC message comprises a cause value indicating a combined RNA update with an NAS message.

3. The apparatus of claim 1, wherein the RRC message comprises an RRC resume request and the RRC response message comprises an RRC resume or RRC release.

4. The apparatus of claim 1, wherein the RRC message further comprises an NAS message.

5. The apparatus of claim 4, wherein the NAS message comprises an NAS registration request.

6. The apparatus of claim 1, wherein the RRC response message further comprises an NAS response.

7. The apparatus of claim 6, wherein the NAS response comprises NAS registration accept.

8. The apparatus of claim 1, wherein the apparatus is further caused to perform at least one of:
send an NAS message to a network node;
receive an NAS response from the network node.

9. The apparatus of claim 1, wherein the apparatus is further caused to:
determine, in response to receiving an NAS response from a network node, whether to resume or release RRC connection; and
send an RRC resume or RRC release to the user equipment based on the determination, or
send an RRC downlink information transfer or RRC release to the user equipment based on the determination.

10. The apparatus of claim 1, wherein the RRC response message comprises an RRC resume complete and the RRC resume complete comprises an NAS message.

11. The apparatus of claim 1, wherein the RRC message is received in response to at least one of the events: a change of base station, an RNA update, a periodic RNA update, a registration update and a periodic registration update.

12. An apparatus comprising:
at least one processor; and
at least one memory including computer program code, wherein the at least one memory and the computer code are configured, with the at least one processor, to cause the apparatus to at least:
send a radio resource control (RRC) message, wherein the RRC message is sent by the apparatus when resuming from an RRC inactive state to an RRC connected state, the RRC message combining a radio access network notification area (RNA) update with a core network level non-access stratum (NAS) registration procedure; and
receive an RRC response message.

13. The apparatus of claim 12, wherein the RRC message comprises a cause value indicating a combined RNA update with an NAS message.

14. The apparatus of claim 12, wherein the RRC message comprises an RRC resume request and the RRC response message comprises an RRC resume or RRC release.

15. The apparatus of claim 12, wherein the RRC message further comprises an NAS message.

16. The apparatus of claim 15, wherein the NAS message comprises an NAS registration request.

17. The apparatus of claim 12, wherein the RRC response message further comprises an NAS response.

18. The apparatus of claim 17, wherein the NAS response comprises NAS registration accept.

19. The apparatus of claim 12, wherein the RRC response message comprises an RRC resume complete and the RRC resume complete comprises an NAS message.

20. The apparatus of claim 12, wherein the RRC response message comprises an RRC downlink information transfer or RRC release, and wherein the RRC downlink information transfer or the RRC release comprises an NAS message.

21. The apparatus of claim 12, wherein the RRC message is sent in response to at least one of the events: a change of base station, an RNA update, a periodic RNA update, a registration update and a periodic registration update.

22. A method comprising:
sending, by a user equipment, a radio resource control (RRC) message, wherein the RRC message is sent by the user equipment when resuming from an RRC inactive state to an RRC connected state, the RRC message combining a radio access network notification area (RNA) update with a core network level non-access stratum (NAS) registration procedure; and
receiving, by the user equipment, an RRC response message.

* * * * *